US012619451B2

(12) United States Patent
Mitchell et al.

(10) Patent No.: US 12,619,451 B2
(45) Date of Patent: May 5, 2026

(54) METHODS AND USER INTERFACES FOR MANAGING WEATHER INFORMATION

(71) Applicant: Apple Inc., Cupertino, CA (US)

(72) Inventors: Wyatt R. Mitchell, San Francisco, CA (US); Andrez E. Aguayo, Culver City, CA (US); Ian V. Bambao, Pittsburgh, CA (US); Punya S. Chatterjee, Los Angeles, CA (US); Benjamin T. Christie, Santa Barbara, CA (US); Kaitlyn E. Chu, Irvine, CA (US); Caroline J. Crandall, Woodside, CA (US); Anton M. Davydov, Gilroy, CA (US); Josh A. Mackey, San Jose, CA (US); Marissa M. Vergel De Dios, Mission Viejo, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 18/542,017

(22) Filed: Dec. 15, 2023

(65) Prior Publication Data

US 2024/0403077 A1      Dec. 5, 2024

Related U.S. Application Data

(60) Provisional application No. 63/470,875, filed on Jun. 3, 2023.

(51) Int. Cl.
| | |
|---|---|
| *G06F 9/451* | (2018.01) |
| *G06F 3/0488* | (2022.01) |
| *G06T 13/80* | (2011.01) |

(52) U.S. Cl.
CPC ............ G06F 9/451 (2018.02); G06F 3/0488 (2013.01); G06T 13/80 (2013.01)

(58) Field of Classification Search
CPC ........ G06F 9/451; G06F 3/0488; G06T 13/80
See application file for complete search history.

(56) References Cited

U.S. PATENT DOCUMENTS

| | | | |
|---|---|---|---|
| 5,500,835 | A | 3/1996 | Born |
| 6,297,795 | B1 | 10/2001 | Kato et al. |
| 6,359,839 | B1 | 3/2002 | Schenk et al. |
| 6,496,780 | B1 | 12/2002 | Harris et al. |
| 6,556,222 | B1 | 4/2003 | Narayanaswami |
| 6,809,724 | B1 | 10/2004 | Shiraishi et al. |
| 7,479,949 | B2 | 1/2009 | Jobs et al. |

(Continued)

FOREIGN PATENT DOCUMENTS

| | | |
|---|---|---|
| EP | 1674889 A1 | 6/2006 |
| EP | 2204702 A1 | 7/2010 |

(Continued)

OTHER PUBLICATIONS

Applicant-Initiated Interview Summary received for U.S. Appl. No. 16/659,507, mailed on Nov. 17, 2020, 3 pages.

(Continued)

*Primary Examiner* — Andrea C Leggett
(74) *Attorney, Agent, or Firm* — YHE Law LLP

(57) ABSTRACT
The present disclosure generally relates to managing weather information. In some embodiments, a first type of input changes a time period for the weather information that is displayed, and a second type of input changes the dataset for the weather information that is displayed.

36 Claims, 13 Drawing Sheets

(56) References Cited

U.S. PATENT DOCUMENTS

| | | | |
|---|---|---|---|
| 7,971,153 | B2 | 6/2011 | Satoh |
| 9,354,768 | B2 | 5/2016 | Oh et al. |
| 9,669,941 | B1* | 6/2017 | Oudom .................. B64D 43/00 |
| 9,753,436 | B2 | 9/2017 | Ely et al. |
| 11,042,281 | B2 | 6/2021 | Yang et al. |
| 2003/0107603 | A1 | 6/2003 | Clapper |
| 2004/0218472 | A1 | 11/2004 | Narayanaswami et al. |
| 2005/0094492 | A1 | 5/2005 | Rosevear et al. |
| 2006/0035628 | A1 | 2/2006 | Miller et al. |
| 2006/0123362 | A1 | 6/2006 | Keely |
| 2007/0211042 | A1 | 9/2007 | Kim et al. |
| 2007/0236475 | A1 | 10/2007 | Wherry |
| 2008/0082930 | A1 | 4/2008 | Omernick et al. |
| 2008/0201647 | A1 | 8/2008 | Lagerstedt et al. |
| 2008/0215240 | A1 | 9/2008 | Howard et al. |
| 2009/0059730 | A1 | 3/2009 | Lyons et al. |
| 2010/0217657 | A1 | 8/2010 | Gazdzinski et al. |
| 2011/0022294 | A1 | 1/2011 | Apley |
| 2011/0076992 | A1 | 3/2011 | Chou et al. |
| 2011/0078624 | A1 | 3/2011 | Missig et al. |
| 2011/0157046 | A1 | 6/2011 | Lee et al. |
| 2011/0179372 | A1 | 7/2011 | Moore et al. |
| 2011/0193878 | A1 | 8/2011 | Seo et al. |
| 2011/0202883 | A1 | 8/2011 | Oh et al. |
| 2013/0254705 | A1 | 9/2013 | Mooring et al. |
| 2014/0136089 | A1 | 5/2014 | Hranac et al. |
| 2014/0229752 | A1 | 8/2014 | Lee et al. |
| 2014/0258935 | A1 | 9/2014 | Nishida et al. |
| 2014/0317543 | A1 | 10/2014 | Kim |
| 2015/0071043 | A1 | 3/2015 | Kubota |
| 2015/0128078 | A1 | 5/2015 | Oh et al. |
| 2015/0160856 | A1 | 6/2015 | Jang et al. |
| 2016/0048283 | A1* | 2/2016 | Yang ..................... G06F 3/0362 715/784 |
| 2016/0098137 | A1 | 4/2016 | Kim et al. |
| 2016/0306806 | A1 | 10/2016 | Fackler et al. |
| 2016/0320756 | A1 | 11/2016 | Lee et al. |
| 2016/0327911 | A1 | 11/2016 | Eim et al. |
| 2016/0327915 | A1 | 11/2016 | Katzer et al. |
| 2017/0108236 | A1* | 4/2017 | Guan ...................... F24F 11/79 |
| 2017/0300013 | A1 | 10/2017 | Satou et al. |
| 2018/0329587 | A1 | 11/2018 | Ko et al. |
| 2019/0033278 | A1 | 1/2019 | Mou et al. |
| 2020/0050332 | A1 | 2/2020 | Yang et al. |
| 2020/0249632 | A1 | 8/2020 | Olwal et al. |
| 2021/0294438 | A1 | 9/2021 | Yang et al. |
| 2021/0311438 | A1* | 10/2021 | Wilson .................... G06F 16/00 |
| 2022/0342117 | A1* | 10/2022 | Miller .................... B64D 43/00 |
| 2022/0391070 | A1* | 12/2022 | Crandall ................. G01W 1/00 |
| 2023/0078153 | A1 | 3/2023 | Yang et al. |
| 2023/0221845 | A1 | 7/2023 | Crandall et al. |
| 2024/0017728 | A1* | 1/2024 | Chung .................. G06N 20/00 |
| 2024/0201838 | A1 | 6/2024 | Yang et al. |
| 2025/0156060 | A1 | 5/2025 | Yang et al. |

FOREIGN PATENT DOCUMENTS

| | | | |
|---|---|---|---|
| TW | 200850058 A | 12/2008 | |
| TW | 201232486 A | 8/2012 | |

OTHER PUBLICATIONS

Applicant-Initiated Interview Summary received for U.S. Appl. No. 17/341,839, mailed on Apr. 29, 2022, 2 pages.

Applicant-Initiated Interview Summary received for U.S. Appl. No. 17/341,839, mailed on Sep. 16, 2022, 2 pages.

Applicant-Initiated Interview Summary received for U.S. Appl. No. 17/987,731, mailed on Nov. 20, 2023, 2 pages.

Applicant-Initiated Interview Summary received for U.S. Appl. No. 18/118,978, mailed on Sep. 22, 2023, 4 pages.

Barbosa Jonathan, "Weather Clock 2.1 for Android", APKPure, Online Available at: https://apkpure.com/weather-clock/com.urbandroid.wclock, Oct. 15, 2015, 3 pages.

Corrected Notice of Allowance received for U.S. Appl. No. 17/341,839, mailed on Oct. 26, 2022, 2 pages.

Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.

Final Office Action received for U.S. Appl. No. 14/821,667, mailed on Apr. 26, 2018, 13 pages.

Final Office Action received for U.S. Appl. No. 17/341,839, mailed on Jul. 18, 2022, 15 pages.

International Preliminary Report on Patentability received for PCT Patent Application No. PCT/US2015/044473, mailed on Mar. 2, 2017, 20 pages.

International Preliminary Report on Patentability received for PCT Patent Application No. PCT/US2015/044485, mailed on Mar. 2, 2017, 20 pages.

International Search Report and Written Opinion received for PCT Patent Application No. PCT/US2015/044473, mailed on Feb. 12, 2016, 24 pages.

International Search Report and Written Opinion received for PCT Patent Application No. PCT/US2015/044485, mailed on Feb. 9, 2016, 27 pages.

Invitation to Pay Additional Fees received for PCT Patent Application No. P CT/US2015/044473, mailed on Nov. 3, 2015, 5 pages.

Invitation to Pay Additional Fees received for PCT Patent Application No. P CT/US2015/044485, mailed on Nov. 3, 2015, 7 pages.

Lynagh Kevin, "The Weathertron", Online available at: https://kevinlynagh.com/weathertron, Jul. 20, 2016, 6 pages.

Non-Final Office Action received for U.S. Appl. No. 14/821,667, mailed on Feb. 4, 2019, 13 pages.

Non-Final Office Action received for U.S. Appl. No. 14/821,667, mailed on Jul. 14, 2017, 12 pages.

Non-Final Office Action received for U.S. Appl. No. 16/659,507, mailed on Oct. 7, 2020, 16 pages.

Non-Final Office Action received for U.S. Appl. No. 17/341,839, mailed on Mar. 17, 2022, 14 pages.

Non-Final Office Action received for U.S. Appl. No. 17/987,731, mailed on Oct. 5, 2023, 15 pages.

Non-Final Office Action received for U.S. Appl. No. 17/476,286, mailed on Sep. 20, 2022, 24 pages.

Non-Final Office Action received for U.S. Appl. No. 18/118,978, mailed on Sep. 1, 2023, 17 pages.

Notice of Allowance received for U.S. Appl. No. 14/821,667, mailed on Jun. 12, 2019, 9 pages.

Notice of Allowance received for U.S. Appl. No. 16/659,507, mailed on Feb. 24, 2021, 7 pages.

Notice of Allowance received for U.S. Appl. No. 17/341,839, mailed on Dec. 2, 2022, 6 pages.

Notice of Allowance received for U.S. Appl. No. 17/341,839, mailed on Oct. 5, 2022, 5 pages.

Notice of Allowance received for U.S. Appl. No. 17/476,286, mailed on Feb. 1, 2023, 15 pages.

Office Action received for Taiwanese Patent Application No. 104126627, issued on Nov. 29, 2016, 9 pages (4 pages of English Translation and 5 pages of Official Copy).

Office Action received for Taiwanese Patent Application No. 104126627, mailed on Aug. 30, 2018, 22 pages (9 pages of English Translation and 13 pages of Official Copy).

Office Action received for Taiwanese Patent Application No. 104126627, mailed on Dec. 20, 2018, 4 pages (2 pages of English Translation and 2 pages of Official Copy).

Office Action received for Taiwanese Patent Application No. 104126627, mailed on Oct. 16, 2017, 7 pages (3 pages of English Translation and 4 pages of Official Copy).

Corrected Notice of Allowance received for U.S. Appl. No. 18/593,825, mailed on Dec. 20, 2024, 5 pages.

Corrected Notice of Allowance received for U.S. Appl. No. 18/593,825, mailed on Dec. 30, 2024, 2 pages.

Non-Final Office Action received for U.S. Appl. No. 18/593,825, mailed on Oct. 24, 2024, 11 pages.

Notice of Allowance received for U.S. Appl. No. 17/987,731, mailed on Dec. 26, 2023, 8 pages.

(56)               References Cited

OTHER PUBLICATIONS

Notice of Allowance received for U.S. Appl. No. 18/118,978, mailed on Dec. 20, 2023, 5 pages.
Notice of Allowance received for U.S. Appl. No. 18/593,825, mailed on Dec. 19, 2024, 7 pages.

* cited by examiner

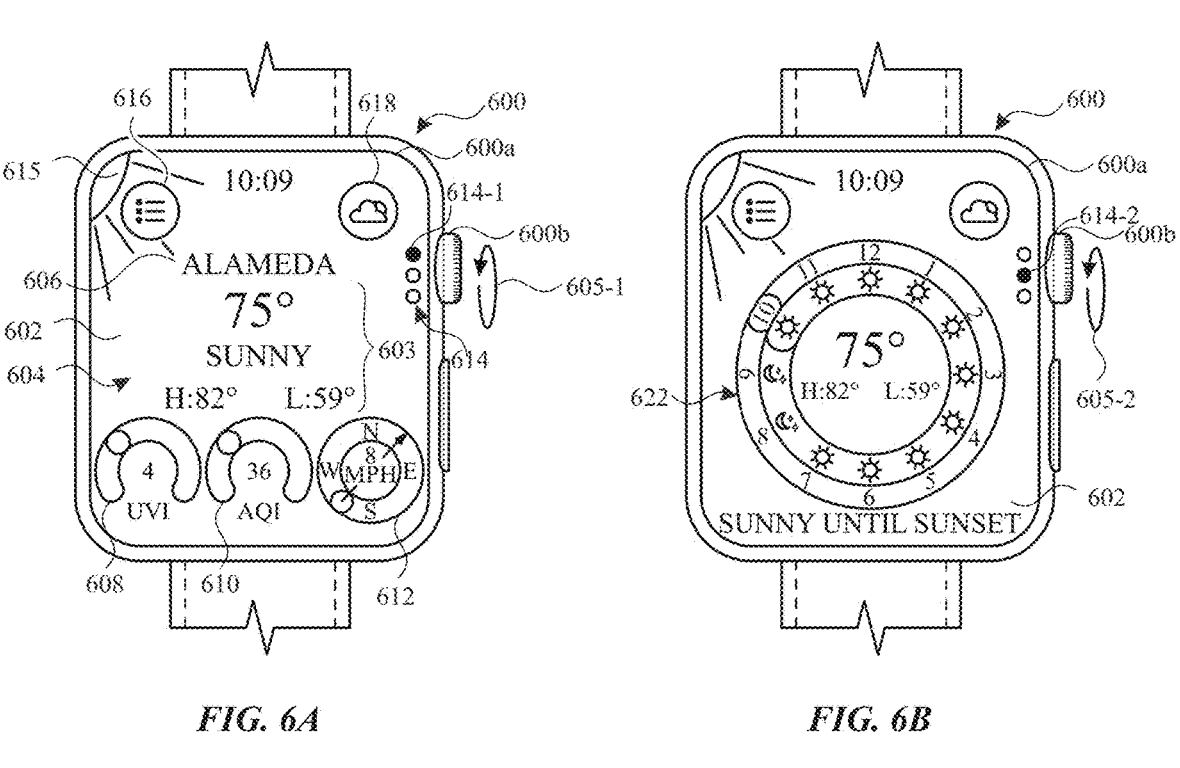
FIG. 6A                                    FIG. 6B
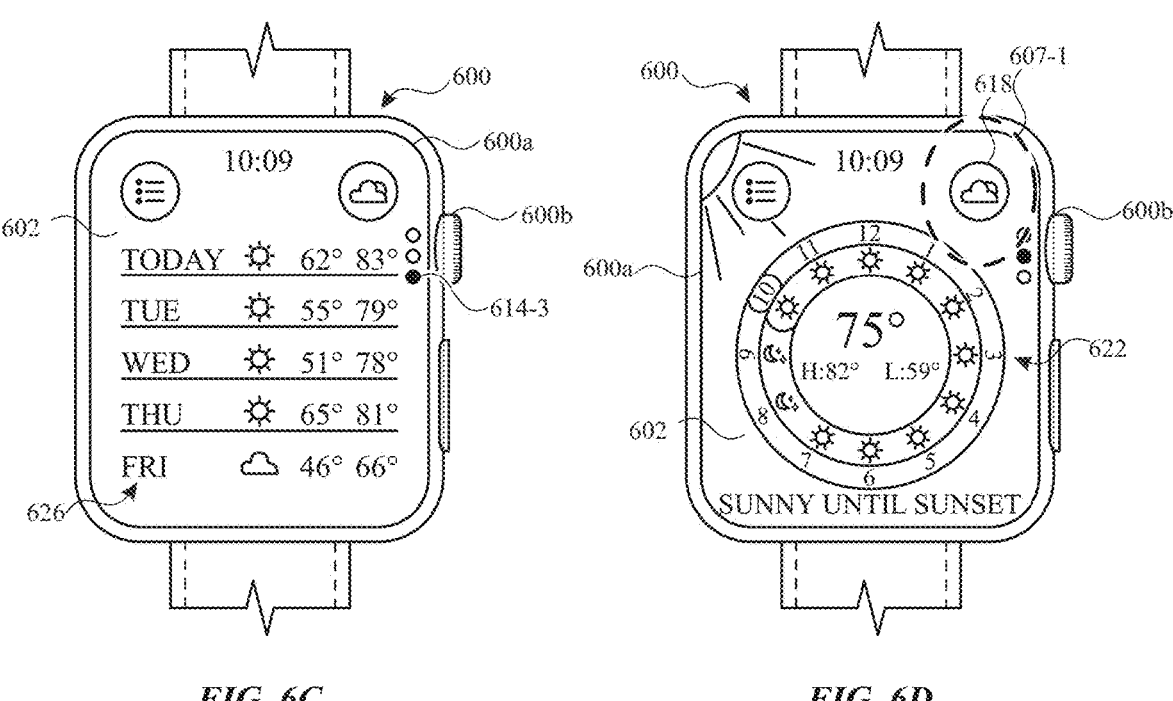
FIG. 6C                                    FIG. 6D

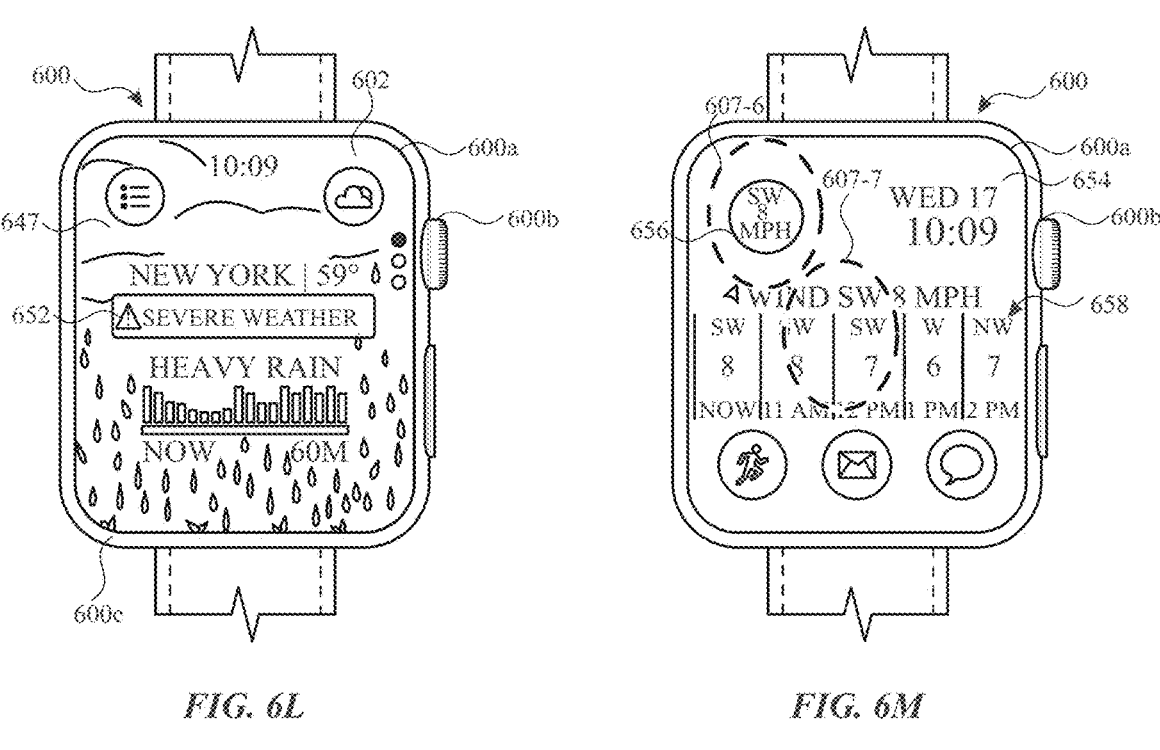
FIG. 6L
FIG. 6M
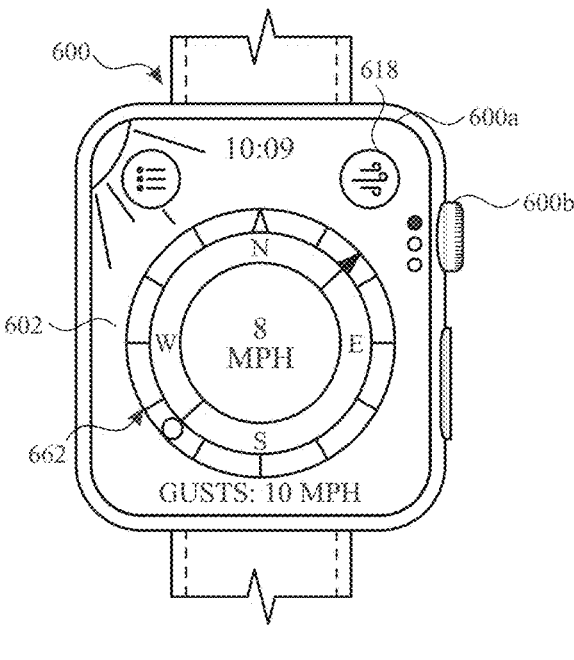
FIG. 6N
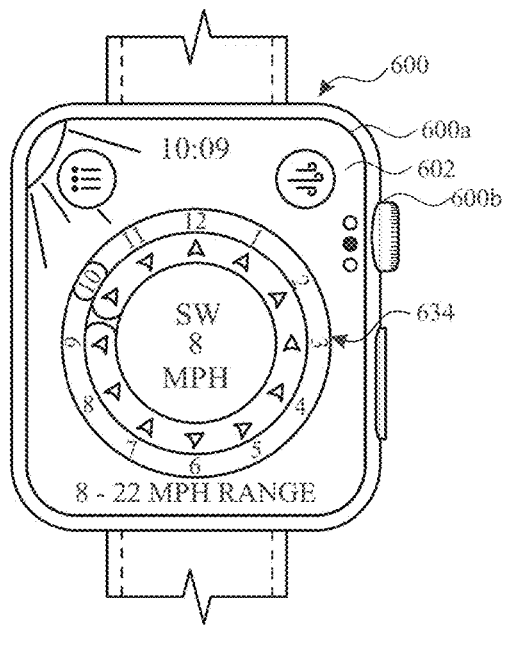
FIG. 6O

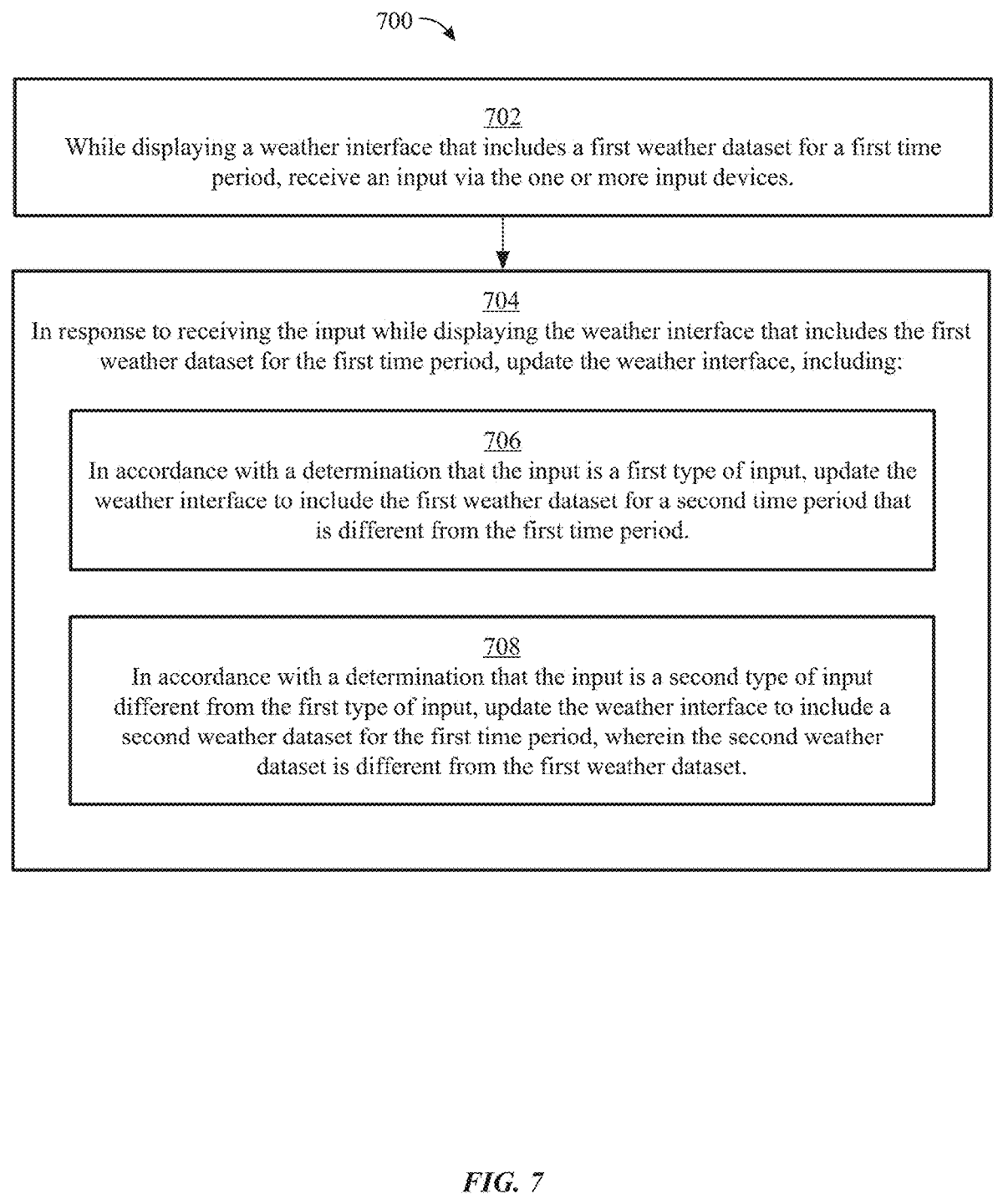

700 ⬋

---

702
While displaying a weather interface that includes a first weather dataset for a first time period, receive an input via the one or more input devices.

⬇

704
In response to receiving the input while displaying the weather interface that includes the first weather dataset for the first time period, update the weather interface, including:

> 706
> In accordance with a determination that the input is a first type of input, update the weather interface to include the first weather dataset for a second time period that is different from the first time period.

> 708
> In accordance with a determination that the input is a second type of input different from the first type of input, update the weather interface to include a second weather dataset for the first time period, wherein the second weather dataset is different from the first weather dataset.

*FIG. 7*

METHODS AND USER INTERFACES FOR MANAGING WEATHER INFORMATION

CROSS-REFERENCE TO RELATED APPLICATIONS

This application claims priority to U.S. Provisional Application No. 63/470,875 titled "METHODS AND USER INTERFACES FOR MANAGING WEATHER INFORMA-TION", filed Jun. 3, 2023, the content of which is hereby incorporated by reference in its entirety.

FIELD

The present disclosure relates generally to computer user interfaces, and more specifically to techniques for managing weather information.

BACKGROUND

User interfaces containing weather information can be displayed using computer systems.

BRIEF SUMMARY

Some techniques for managing weather information using electronic devices, however, are generally cumbersome and inefficient. For example, some existing techniques use a complex and time-consuming user interface, which may include multiple key presses or keystrokes. Existing tech-niques require more time than necessary, wasting user time and device energy. This latter consideration is particularly important in battery-operated devices.

Accordingly, the present technique provides electronic devices with faster, more efficient methods and interfaces for managing weather information. Such methods and interfaces optionally complement or replace other methods for man-aging weather information. Such methods and interfaces reduce the cognitive burden on a user and produce a more efficient human-machine interface. For battery-operated computing devices, such methods and interfaces conserve power and increase the time between battery charges.

Example methods are described herein. An example method includes, at a computer system that is in communi-cation with a display generation component and one or more input devices: while displaying, via the display generation component, a weather interface that includes a first weather dataset for a first time period, receiving an input via the one or more input devices; and in response to receiving the input while displaying the weather interface that includes the first weather dataset for the first time period, updating the weather interface, including: in accordance with a determi-nation that the input is a first type of input, updating the weather interface to include the first weather dataset for a second time period that is different from the first time period; and in accordance with a determination that the input is a second type of input different from the first type of input, updating the weather interface to include a second weather dataset for the first time period, wherein the second weather dataset is different from the first weather dataset.

Example non-transitory computer-readable storage media are described herein. An example non-transitory computer-readable storage medium stores one or more programs configured to be executed by one or more processors of a computer system that is in communication with a display generation component and one or more input devices, the one or more programs including instructions for: while displaying, via the display generation component, a weather interface that includes a first weather dataset for a first time period, receiving an input via the one or more input devices; and in response to receiving the input while displaying the weather interface that includes the first weather dataset for the first time period, updating the weather interface, includ-ing: in accordance with a determination that the input is a first type of input, updating the weather interface to include the first weather dataset for a second time period that is different from the first time period; and in accordance with a determination that the input is a second type of input different from the first type of input, updating the weather interface to include a second weather dataset for the first time period, wherein the second weather dataset is different from the first weather dataset.

Example transitory computer-readable storage media are described herein. An example transitory computer-readable storage medium stores one or more programs configured to be executed by one or more processors of a computer system that is in communication with a display generation compo-nent and one or more input devices, the one or more programs including instructions for: while displaying, via the display generation component, a weather interface that includes a first weather dataset for a first time period, receiving an input via the one or more input devices; and in response to receiving the input while displaying the weather interface that includes the first weather dataset for the first time period, updating the weather interface, including: in accordance with a determination that the input is a first type of input, updating the weather interface to include the first weather dataset for a second time period that is different from the first time period; and in accordance with a deter-mination that the input is a second type of input different from the first type of input, updating the weather interface to include a second weather dataset for the first time period, wherein the second weather dataset is different from the first weather dataset.

Example computer systems are described herein. An example computer system is configured to communicate with a display generation component and one or more input devices and includes: one or more processors; and memory storing one or more programs configured to be executed by the one or more processors, the one or more programs including instructions for: while displaying, via the display generation component, a weather interface that includes a first weather dataset for a first time period, receiving an input via the one or more input devices; and in response to receiving the input while displaying the weather interface that includes the first weather dataset for the first time period, updating the weather interface, including: in accor-dance with a determination that the input is a first type of input, updating the weather interface to include the first weather dataset for a second time period that is different from the first time period; and in accordance with a deter-mination that the input is a second type of input different from the first type of input, updating the weather interface to include a second weather dataset for the first time period, wherein the second weather dataset is different from the first weather dataset.

An example computer system is configured to communi-cate with a display generation component and one or more input devices and includes means for, while displaying, via the display generation component, a weather interface that includes a first weather dataset for a first time period, receiving an input via the one or more input devices; and means for, in response to receiving the input while display-ing the weather interface that includes the first weather dataset for the first time period, updating the weather interface, including: in accordance with a determination that the input is a first type of input, updating the weather interface to include the first weather dataset for a second time period that is different from the first time period; and in accordance with a determination that the input is a second type of input different from the first type of input, updating the weather interface to include a second weather dataset for the first time period, wherein the second weather dataset is different from the first weather dataset.

Example computer program products are described herein. An example computer program product includes one or more programs configured to be executed by one or more processors of a computer system that is in communication with a display generation component and one or more input devices, the one or more programs including instructions for: while displaying, via the display generation component, a weather interface that includes a first weather dataset for a first time period, receiving an input via the one or more input devices; and in response to receiving the input while displaying the weather interface that includes the first weather dataset for the first time period, updating the weather interface, including: in accordance with a determination that the input is a first type of input, updating the weather interface to include the first weather dataset for a second time period that is different from the first time period; and in accordance with a determination that the input is a second type of input different from the first type of input, updating the weather interface to include a second weather dataset for the first time period, wherein the second weather dataset is different from the first weather dataset.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing weather information, thereby increasing the effectiveness, efficiency, and user satisfaction with such devices. Such methods and interfaces may complement or replace other methods for managing weather information.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 7 is a flow diagram illustrating a method for managing weather information, in accordance with some embodiments.

DESCRIPTION OF EMBODIMENTS

Figure 1A:
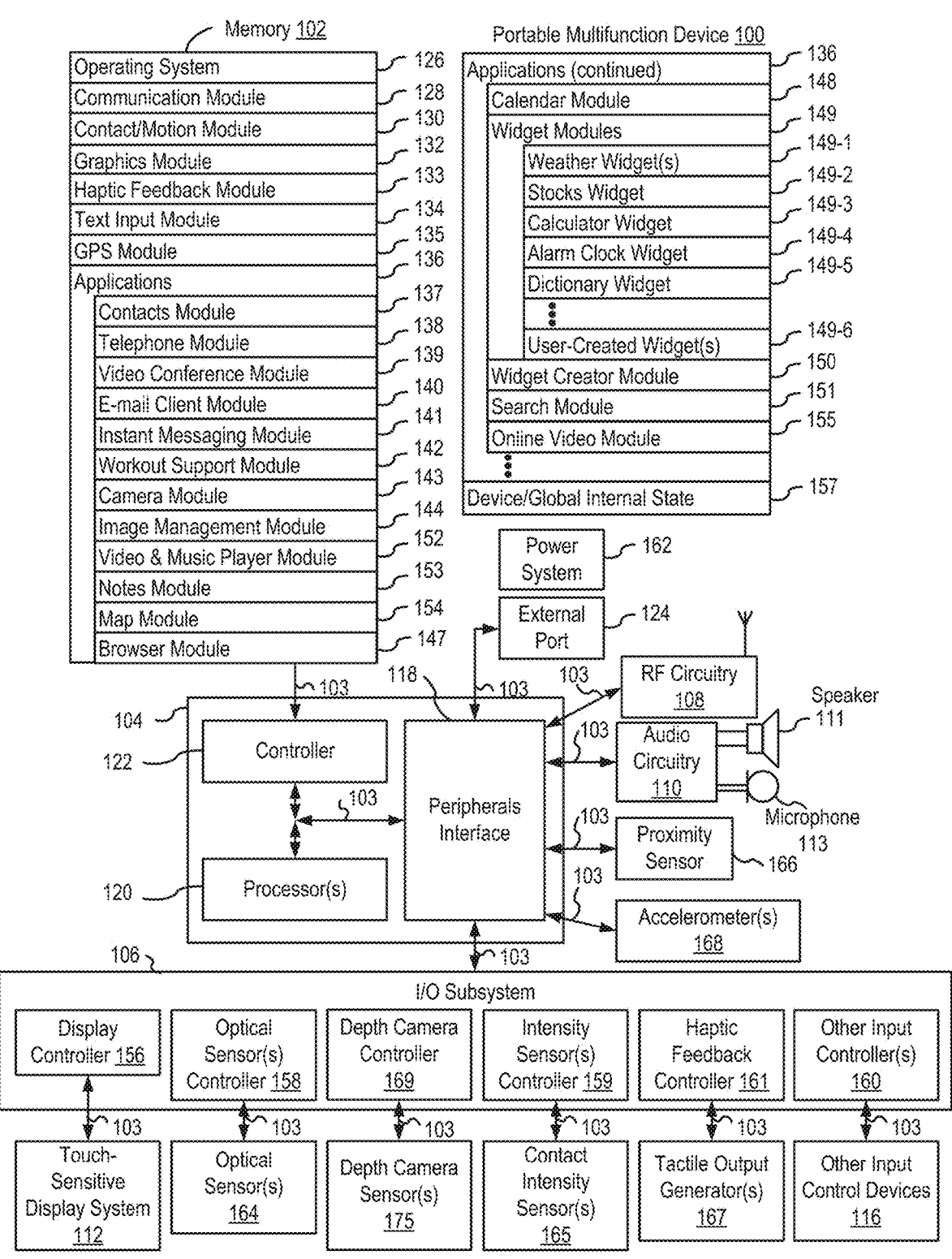
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing weather information. Such techniques can reduce the cognitive burden on a user who accesses weather information, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing weather information. FIGS. 6A-6O illustrate exemplary user interfaces for managing weather information. FIG. 7 is a flow diagram illustrating methods of managing weather information in accordance with some embodiments. The user interfaces in FIGS. 6A-6O are used to illustrate the processes described below, including the processes in FIG. 7.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patents application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
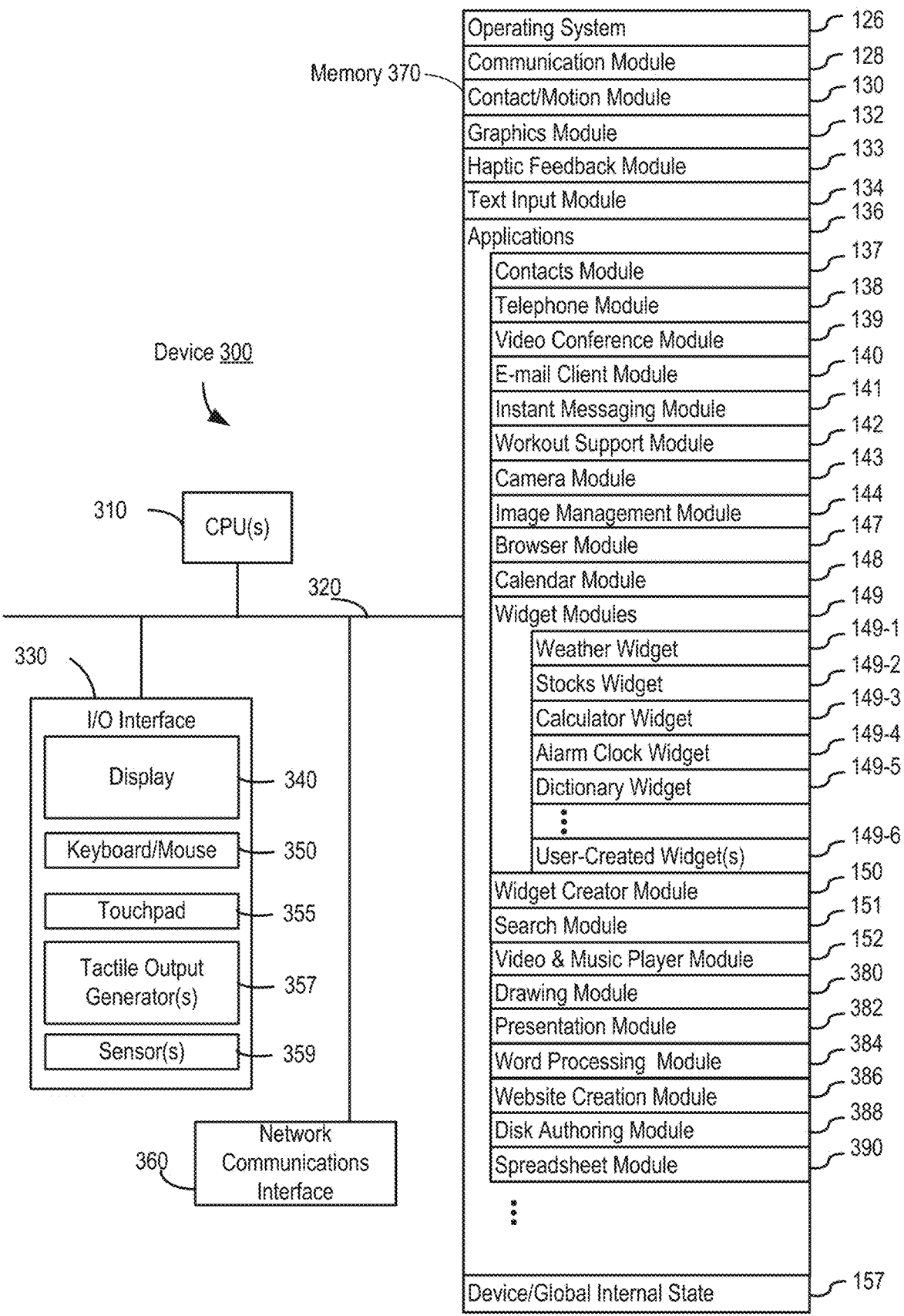
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch" /multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;

- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
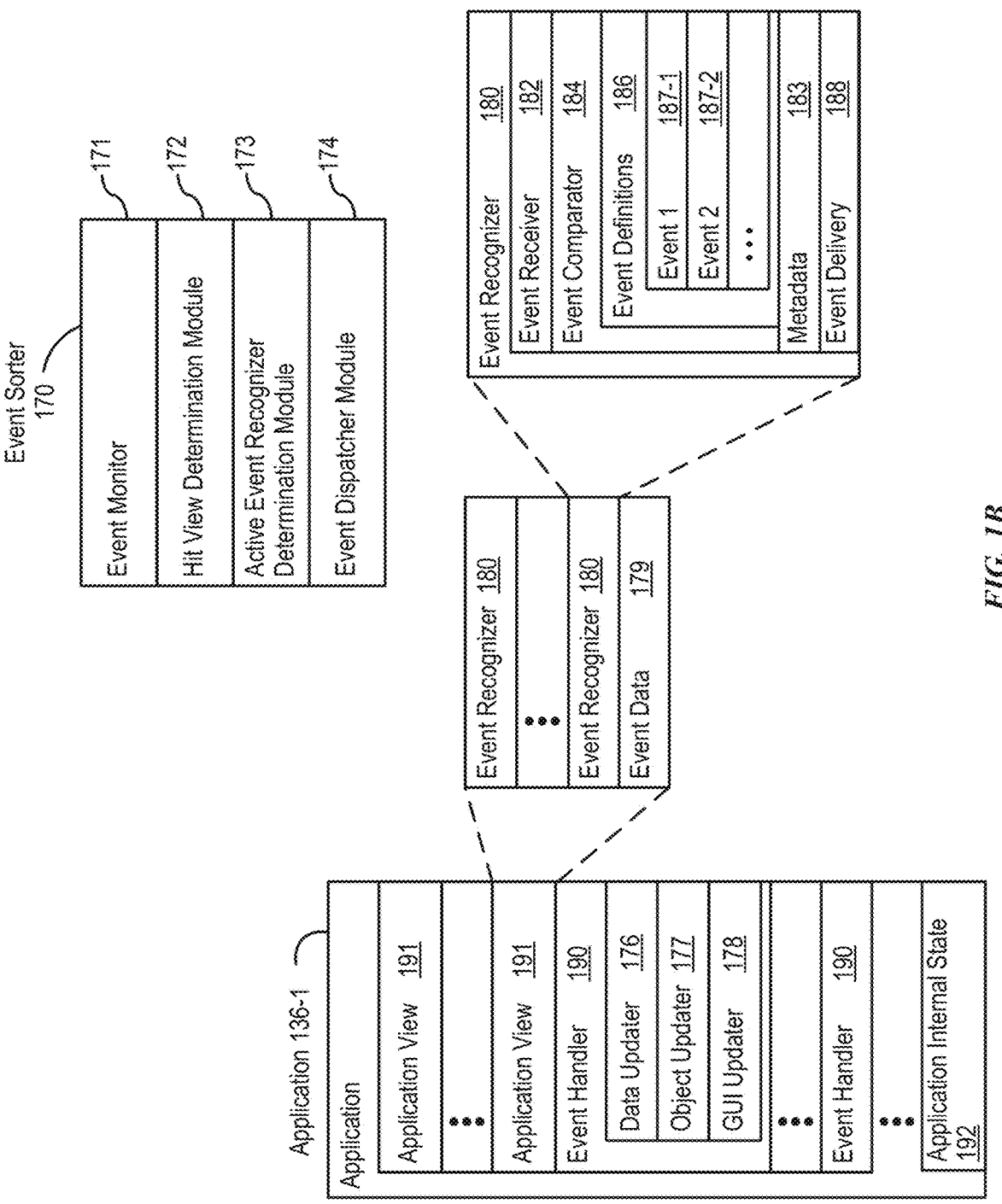
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
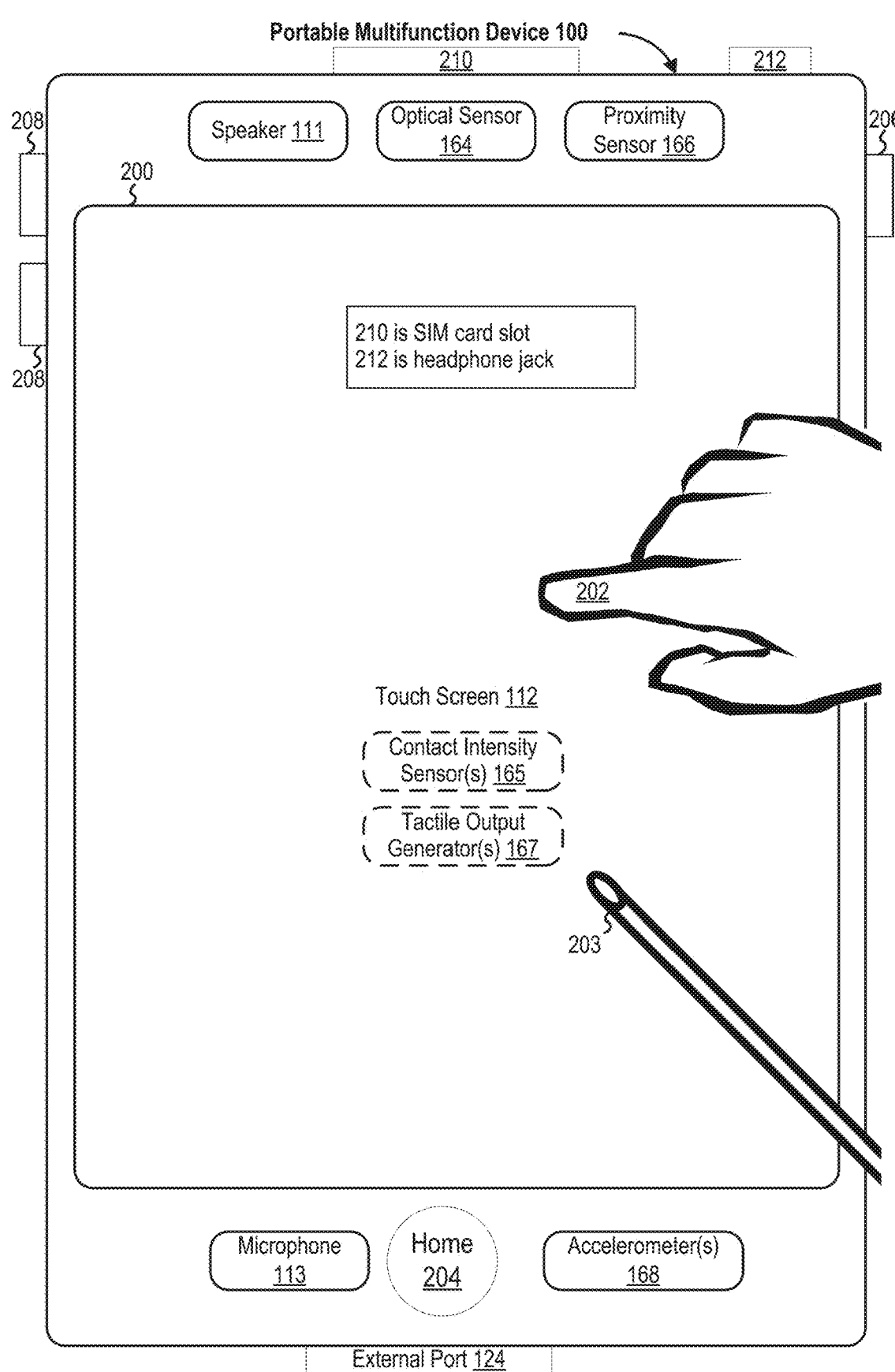
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
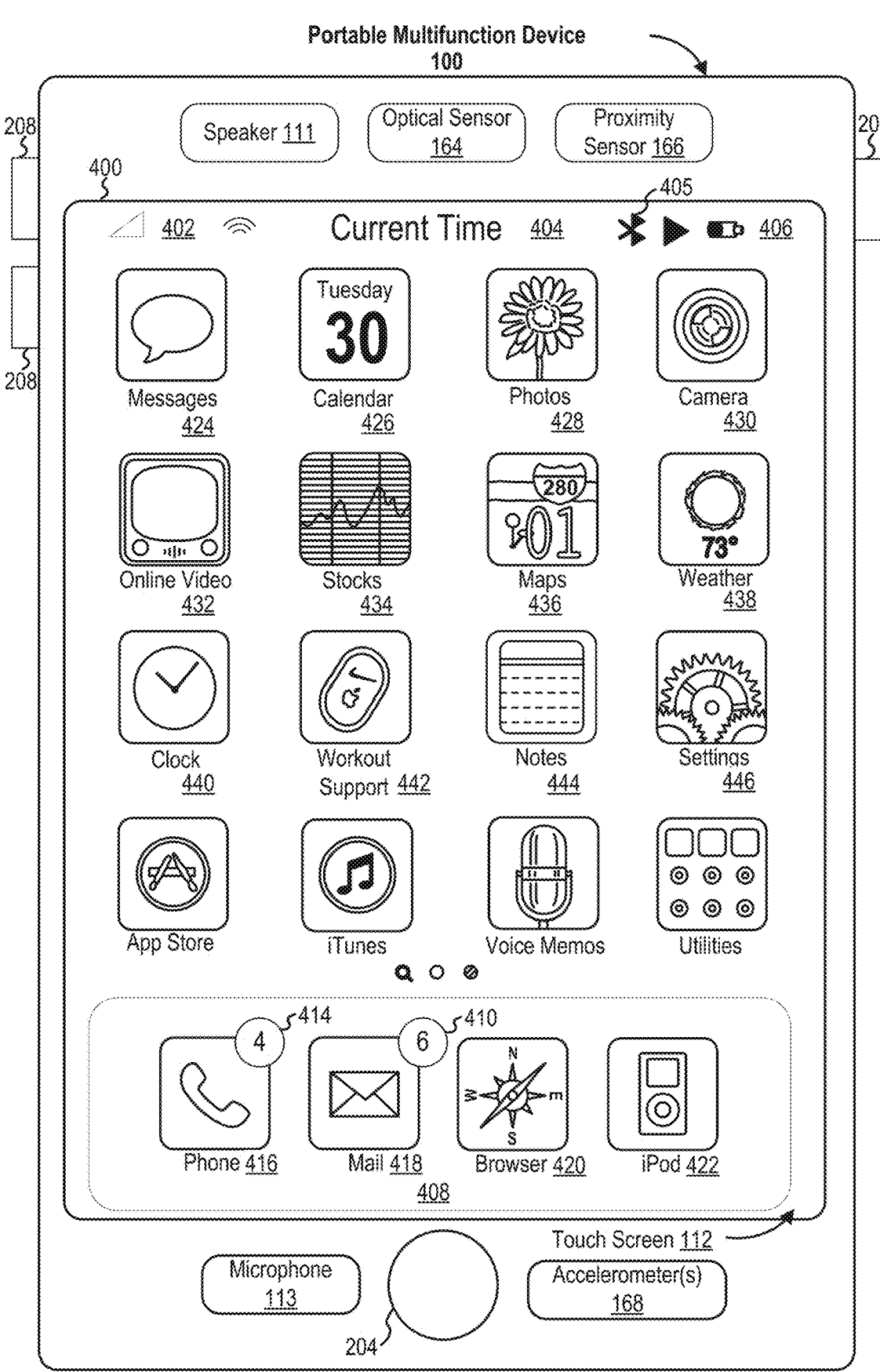
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
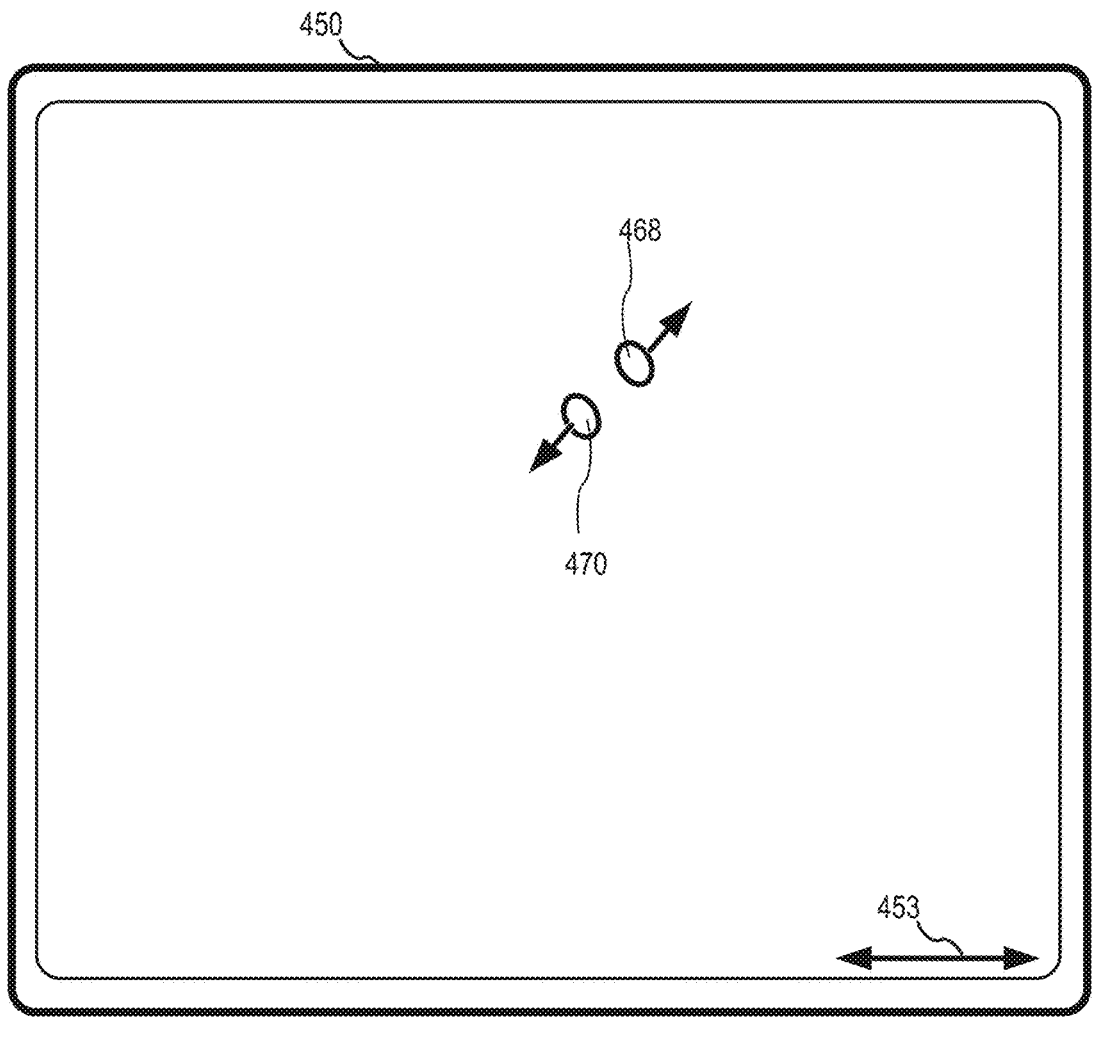
FIG. 4B illustrates an exemplary user interface for a multifunction device with a touch-sensitive surface that is separate from the display in accordance with some embodiments.
Figure 4B:
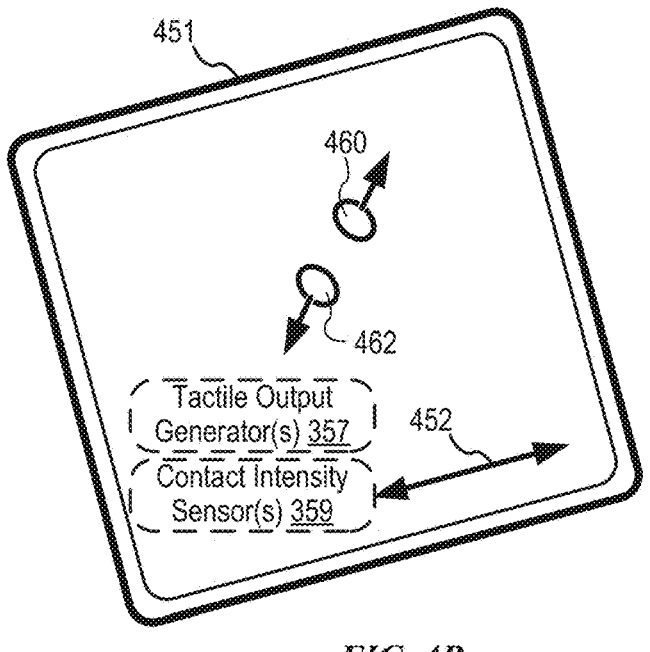

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., touch-sensitive surface 451 in FIG. 4B) are used by the device to manipulate the user interface on the display (e.g., display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
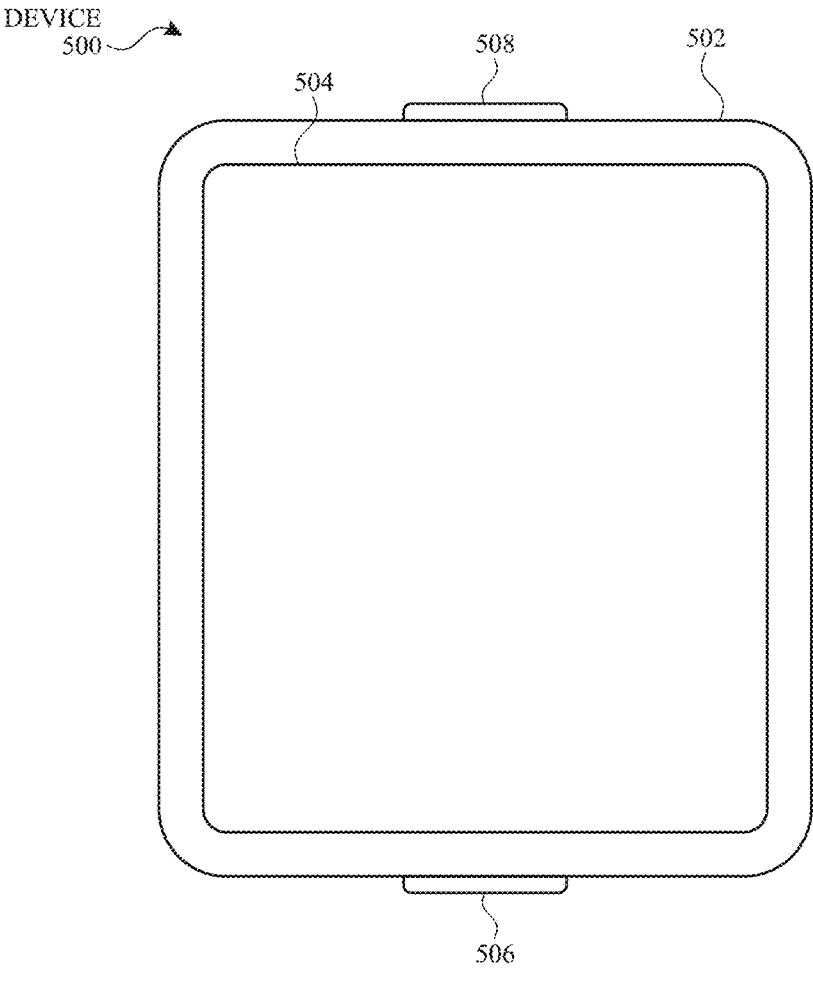
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
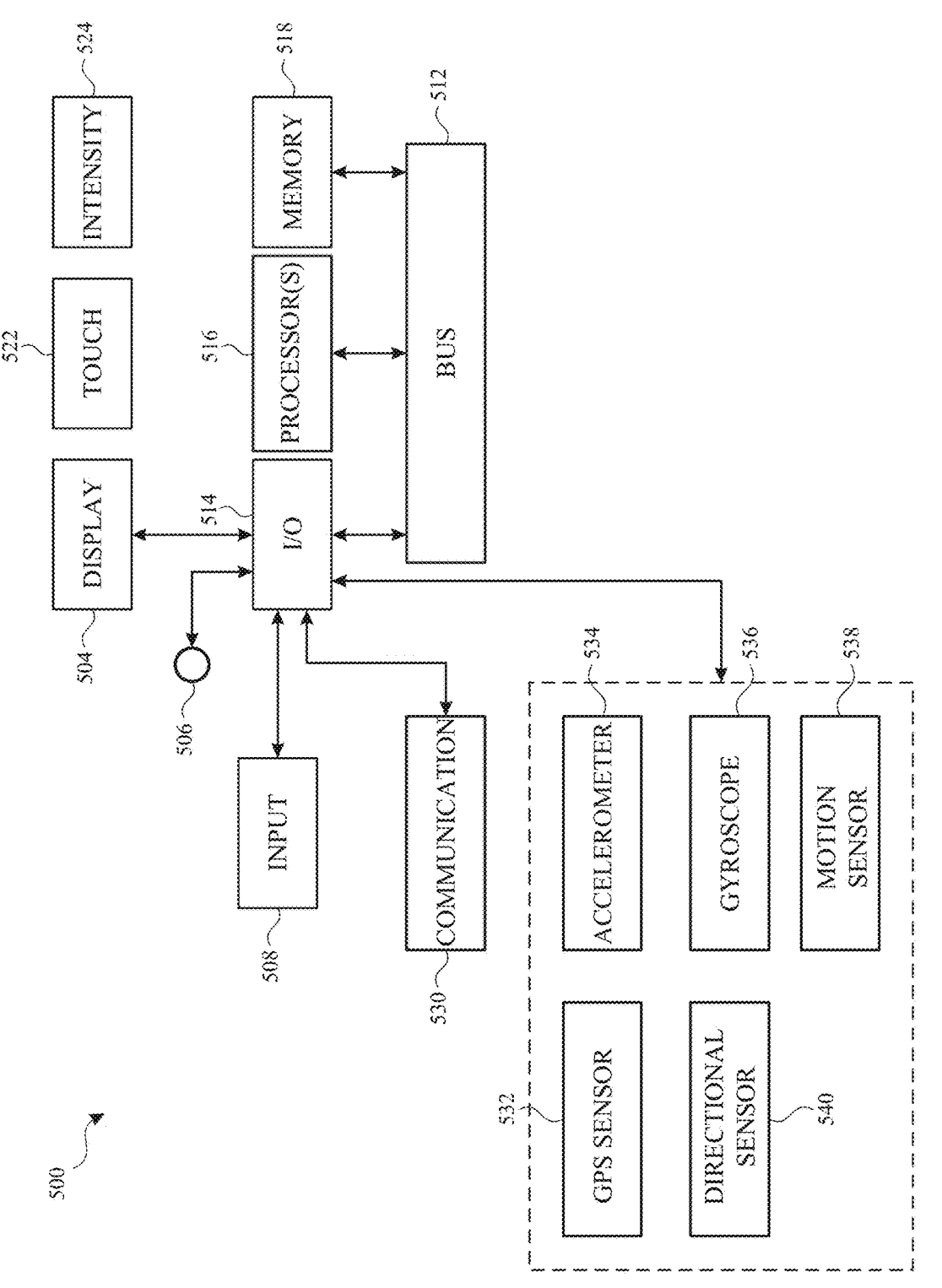
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6O illustrate exemplary user interfaces for managing weather information, in accordance with some embodiments. The user interfaces in these figures are used to illustrate the processes described below, including the processes in FIG. 7.

FIG. 6A depicts computer system 600 (e.g., a smartwatch), which includes display 600a (e.g., a touch-sensitive display) and crown 600b (e.g., a rotatable input mechanism). In some embodiments, computer system 600 includes one or more elements from device 100, device 300, and/or device 500. As shown in FIG. 6A, computer system 600 displays, via display 600a, weather interface 602, which is a user interface for a weather application that provides weather data such as a weather forecast including future forecast information and/or current weather information. Weather interface 602 provides a representation of weather information that is included in a respective weather dataset, for a specific time period, and for a particular location.

As described herein, weather information can be categorized into weather datasets such as weather conditions (e.g., sunny, cloudy, rainy, snowy, windy), air quality index (AQI), temperature, precipitation, humidity, visibility, ultraviolet index (UVI), wind speed, and/or wind direction. In some embodiments, weather information can be included in more than one of the datasets. For example, a wind speed dataset can also include wind direction information. As another example, a weather conditions dataset can also include temperature information, wind speed information, and/or wind direction information. In general, weather interface 602 provides weather information for a selected weather dataset and location. Weather interface 602 presents the weather information for a selected weather dataset in various forecasts based on a selected time period.

In the embodiment depicted in FIG. 6A, weather interface 602 includes current weather conditions information 604. Current weather conditions information 604 contains current weather information for the weather conditions dataset at a particular location 606 (e.g., Alameda). The weather conditions weather dataset includes information about weather conditions for a particular location such as, for example, whether the weather at the location is cloudy, partly cloudy, rainy, snowy, or sunny. In FIG. 6A, current weather conditions information 604 includes current weather conditions 603 for Alameda, indicating a current temperature of 75° F., currently sunny skies, and forecast high and low temperatures of 82° F. and 59° F., respectively. In some embodiments, the weather conditions dataset includes information from other weather datasets. For example, in FIG. 6A, current weather conditions information 604 includes current UVI 608 indicating an ultraviolet index reading of 4 in Alameda, current AQI 610 indicating an air quality index reading of 36 in Alameda, and current wind data 612 indicating a current wind speed of 8MPH from the southwest (SW) direction in Alameda. In some embodiments, current weather conditions information 604 can include current weather information for datasets different than those depicted in FIG. 6A. In some embodiments, computer system 600 displays a visual representation of the current weather conditions in a background region of weather interface 602. For example, in FIG. 6A, computer system 600 displays sun 615 indicating the current sunny weather conditions for Alameda.

Weather interface 602 also includes location affordance 616 and weather affordance 618. Location affordance 616 is selectable to change the location that is associated with the weather information, and weather affordance 618 is selectable to change the weather dataset for weather interface 602. In some embodiments, weather affordance 618 has an appearance that indicates the currently selected dataset. For example, in FIG. 6A, computer system 600 displays weather affordance 618 having a cloud in front of the sun to indicate the weather conditions dataset is selected for weather interface 602.

Weather interface 602 displays weather information for a selected weather dataset and a selected time period. Weather interface 602 includes page dots 614 to indicate different portions of weather interface 602 corresponding to the time periods associated with the weather information. A selected (e.g., darkened) dot indicates the currently displayed portion of weather interface 602. In the embodiments described herein, weather interface 602 includes a top portion (represented by dot 614-1) that includes weather information for a current time period, a middle portion (represented by dot 614-2) that includes weather information for an hourly time period, and a bottom portion (represented by dot 614-3) that includes weather information for a weekly time period. For example, in FIG. 6A, the selected weather dataset is the "weather conditions" dataset and the selected time period is a "current" time period, shown in a top portion of weather interface 602 as indicated by selected dot 614-1. Thus, current weather conditions information 604 represents current information, or a "now" forecast, for the weather conditions dataset. In other words, the weather information depicted in FIG. 6A corresponds to current data for the weather conditions dataset, rather than a predicted forecast for the weather conditions. In some embodiments, weather interface 602 can include other time periods such as, for example, a daily time period (e.g., a daily forecast), a 5-day time period (e.g., a 5-day forecast), a 10-day time period (e.g., a 10-day forecast), and/or a 15-day time period (e.g., a 15-day forecast).

In some embodiments, the time period for the selected weather dataset can be changed (e.g., without changing the selected dataset) using a first type of input such as scrolling crown 600b, whereas the weather dataset can be changed (e.g., without changing the time period) using a second type of input such as tapping on weather interface 602. Additionally, the weather dataset can be changed by selecting a weather dataset from a listing of weather datasets that is displayed in response to selecting weather affordance 618. FIGS. 6A-6O provide user interfaces illustrating various embodiments for updating weather interface 602 using different inputs, as described in greater detail below.

In FIG. 6A, computer system 600 detects input 605-1, which is a downward scroll gesture on crown 600b. In response, computer system 600 updates the time period for weather interface 602, while maintaining the selected weather dataset (e.g., weather conditions), as shown in FIG. 6B. FIG. 6B depicts hourly weather conditions forecast 622, which is a representation of the weather conditions dataset for an hourly time period (e.g., a 12-hour period). Hourly weather conditions forecast 622 provides a representation of weather conditions information including a current temperature, forecast high and low temperatures, and an hourly representation of the weather conditions for the next 12 hours. In FIG. 6B, hourly weather conditions forecast 622 indicates that the forecast weather conditions are sunny from the 10 o'clock hour until the 8 o'clock hour (e.g., around sunset) and clear night skies for the 8 o'clock and 9 o'clock hours. In FIG. 6B, dot 614-2 is selected, indicating that the hourly time period is selected for weather interface 602.

In FIG. 6B, computer system 600 detects input 605-2, which is a downward scroll gesture on crown 600*b*. In response, computer system 600 updates the time period for weather interface 602, while maintaining the selected weather dataset (e.g., weather conditions), as shown in FIG. 6C. FIG. 6C depicts weekly weather conditions forecast 626, which is a representation of the weather conditions dataset for a weekly time period (e.g., a 7-day period). Weekly weather conditions forecast 626 provides a representation of weather conditions information for each day in the week, including forecast high and low temperatures for each day and a daily representation of the weather conditions for the current week. In FIG. 6C, weekly weather conditions forecast 626 indicates that the weather conditions are sunny from today until Thursday and are cloudy on Friday. In some embodiments, weekly weather conditions forecast 626 can be scrolled (e.g., via a scroll gesture on display 600*a*) to display the weather conditions forecast for Saturday and Sunday. In FIG. 6C, dot 614-3 is selected, indicating that the weekly time period is selected for weather interface 602.

As described above, FIGS. 6A-6C illustrate computer system 600 updating weather interface 602 by cycling from current information (e.g., a "now" forecast), to an hourly forecast, and then to a weekly forecast by scrolling crown 600*b* in a downward direction. It should be appreciated that crown 600*b* can be scrolled in the opposite direction (e.g., upward) to cycle the forecasts for weather interface 602 in the opposite direction. For example, scrolling crown 600*b* in the upward direction in FIG. 6B causes computer system 600 to update weather interface 602 with the content depicted in FIG. 6A.

Figures 6E, 6F, 6G:
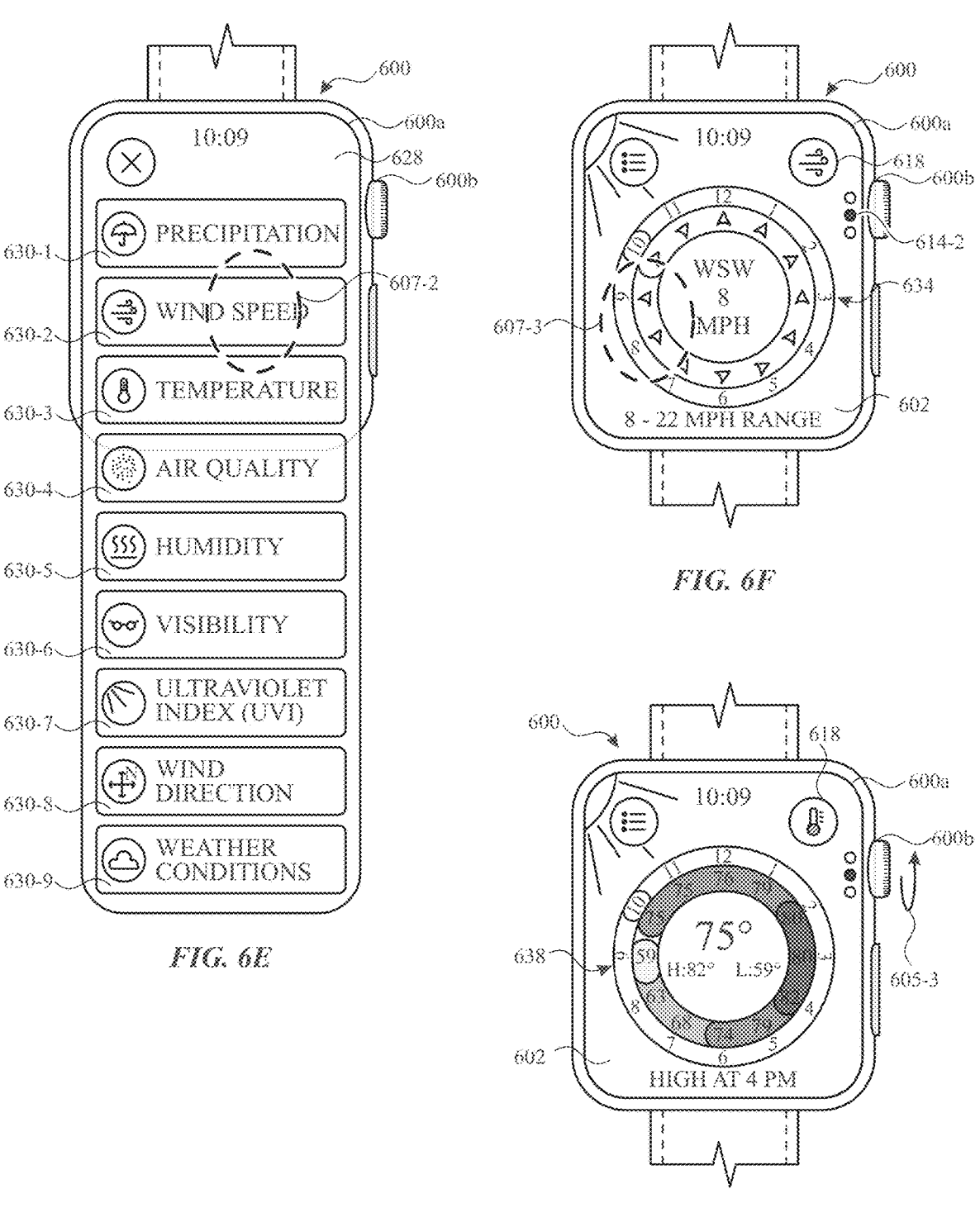
FIGS. 6A-6O illustrate exemplary user interfaces for managing weather information, in accordance with some embodiments.

FIGS. 6D-6F depict example user interfaces of an embodiment in which the weather dataset for weather interface 602 is changed by selecting a weather dataset from a list of weather datasets. In FIG. 6D, computer system 600 displays weather interface 602 including hourly weather conditions forecast 622 and weather affordance 618. Computer system 600 detects input 607-1 (e.g., a tap input) on weather affordance 618 and, in response, displays dataset listing 628, as shown in FIG. 6E. The dataset listing in FIG. 6E includes precipitation dataset 630-1, wind speed dataset 630-2, temperature dataset 630-3, air quality dataset 630-4, humidity dataset 630-5, visibility dataset 630-6, ultraviolet index dataset 630-7, wind direction dataset 630-8, and weather conditions dataset 630-9. Weather conditions dataset 630-9 is currently selected, as indicated by the display of the weather conditions information in FIG. 6D. In some embodiments, dataset listing 628 can be scrolled (e.g., by scrolling crown 600*b* and/or a scroll gesture on display 600*a*) to view the datasets in the listing. In some embodiments, tapping on weather interface 602 cycles through the datasets in listing 628 (e.g., cycling from one selected dataset to the next dataset in the listing), as described in greater detail below.

When a respective weather dataset from dataset listing 628 is selected, computer system 600 updates weather interface 602 with weather information for the selected weather dataset. For example, in FIG. 6E, computer system

600 detects input 607-2 selecting wind speed dataset 630-2 from dataset listing 628 and, in response, displays weather interface 602 updated with weather information for the wind speed dataset, as shown in FIG. 6F. In FIG. 6F, weather interface 602 includes hourly wind speed forecast 634, which provides a representation of wind information for an hourly time period (e.g., a 12-hour period). Hourly wind speed forecast 634 provides a representation of wind information including a current wind speed and direction, and an hourly representation of the wind direction and range of wind speeds for the next 12 hours. In some embodiments, wind speed forecast 634 includes an hourly representation of the wind speed for the next 12 hours. As shown in FIG. 6F, weather affordance 618 is updated to have a wind appearance that indicates that the wind speed dataset is selected for weather interface 602. It should be appreciated that crown 600*b* can be scrolled (e.g., via a downward scroll gesture) to the bottom portion of weather interface 602 (corresponding to page dot 614-3) to display the weekly wind speed forecast for the wind speed dataset. Similarly, crown 600*b* can be scrolled (e.g., via an upward scroll gesture) to the top portion of weather interface 602 (corresponding to page dot 614-1) to display the current wind speed conditions (e.g., a "now" forecast for the wind speed dataset).

As previously mentioned, in some embodiments, computer system 600 updates weather interface 602 with information from a different dataset in response to a tap input on weather interface 602. For example, in FIG. 6F, computer system 600 detects input 607-3 on weather interface 602 (e.g., at a location that is not on weather affordance 618 or on location affordance 616) and, in response, updates weather interface 602 with weather information from the temperature dataset, as shown in FIG. 6G. In FIG. 6G, weather interface 602 includes hourly temperature forecast 638, which provides a representation of temperature information for an hourly time period (e.g., a 12-hour period). Hourly temperature forecast 638 provides a representation of temperature information including a current temperature, forecast high and low temperatures, and an hourly representation of the temperature for the next 12 hours. As shown in FIG. 6G, weather affordance 618 is updated to have a thermometer appearance that indicates that the temperature dataset is selected for weather interface 602. It should be appreciated that a user can continue to tap on weather interface 602 to cycle to subsequent weather datasets in dataset listing 628, without having to access the next weather dataset from the listing as described with respect to FIGS. 6D and 6E. For example, tapping on weather interface 602 in FIG. 6G updates weather interface with weather information from the air quality dataset, and again tapping on the weather interface 602 updates the weather interface with weather information from the humidity dataset.

Figures 6H, 6I, 6J, 6K:
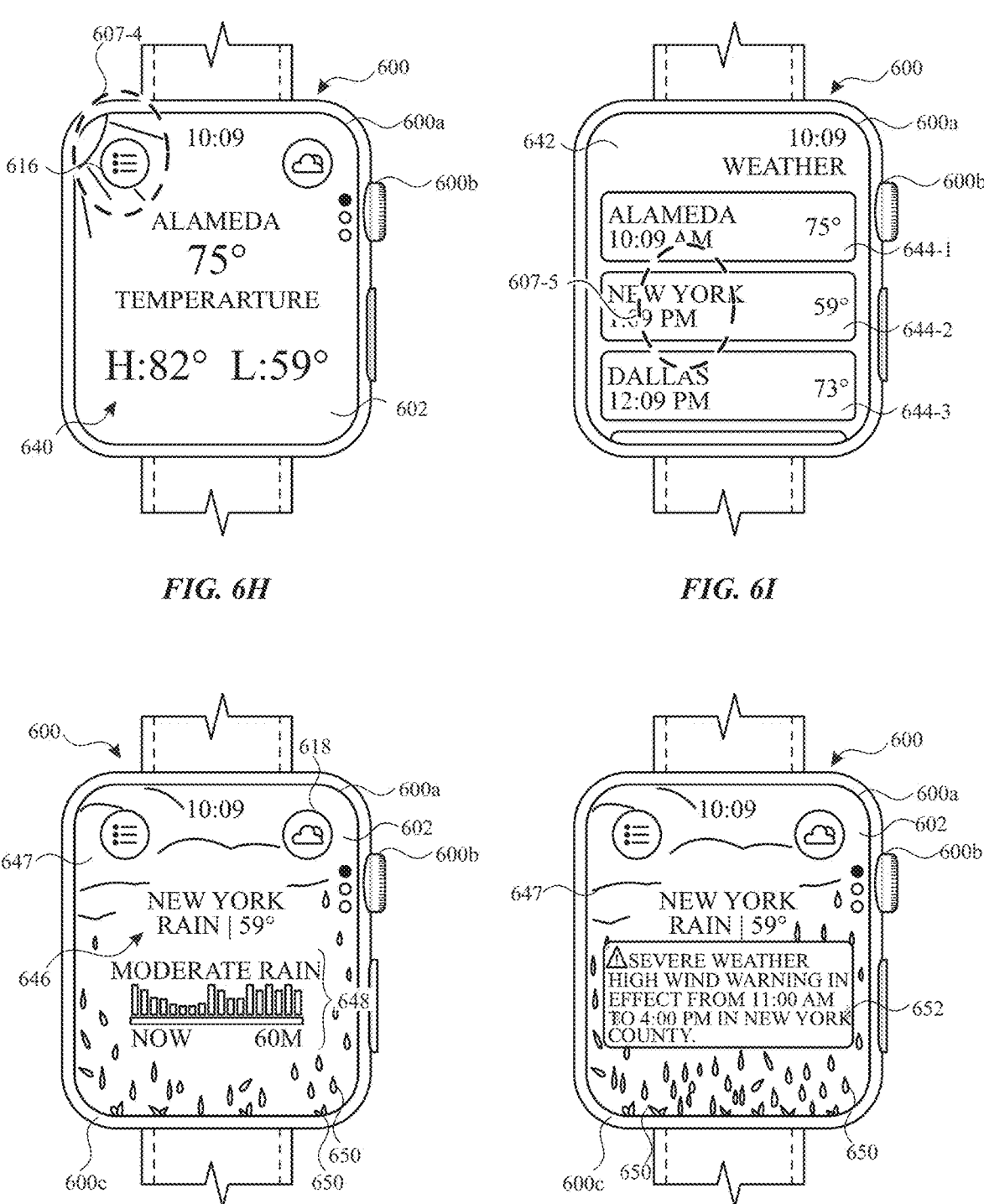

In FIG. 6G, computer system 600 detects input 605-3 (e.g., an upward scroll gesture) on crown 600*b* and, in response, updates weather interface 602 to display current temperature information 640, as shown in FIG. 6H. Current temperature information 640 corresponds to a "now" forecast for the temperature dataset and includes the current temperature in Alameda as well as the forecast high and low temperatures. It should be appreciated that crown 600*b* can be scrolled to the bottom portion of weather interface 602 (corresponding to page dot 614-3) to display the weekly temperature forecast for the temperature dataset.

In some embodiments, weather interface 602 can be updated to change the location corresponding to the currently selected weather dataset and time period. For example, in FIG. 6H computer system 600 detects input 607-4 (e.g., a tap input) selecting location affordance 616 and, in response, displays location listing 642, as shown in FIG. 6I. Location listing 642 includes a listing of locations that can be selected to change the location that is associated with weather interface 602. In FIG. 6I, location listing 642 includes Alameda location 644-1, New York location 644-2, and Dallas location 644-3. Computer system 600 detects input 607-5 selecting New York location 644-2 and, in response, changes the location that is associated with the weather information to the New York location. For example, in FIG. 6J, weather interface 602 is updated to show the current weather conditions for New York. In some embodiments, the interface depicted in FIG. 6J is displayed in response to input 607-5 selecting New York location 644-2 in FIG. 6I. In some embodiments, the interface depicted in FIG. 6J is displayed after selecting New York location 644-2 and then changing the dataset to the weather conditions dataset (e.g., by tapping on weather interface 602 or by selecting weather conditions dataset 630-9 from listing 628).

In FIG. 6J, computer system 600 displays weather interface 602 with current weather conditions for New York. Weather interface includes current weather conditions information 646, indicating it is currently raining and 59° F. in New York. Current weather conditions information 646 also includes indication 648 of moderate rainfall and a short-term forecast of rain. In some embodiments, computer system 600 displays weather interface 602 with an animated background for current weather conditions. For example, in FIG. 6J, computer system 600 displays storm clouds 647 and rainfall 650 in the background of weather interface 602. In the embodiments depicted in FIGS. 6J-6L, computer system 600 displays rainfall 650 as an animated effect where the rain falls in the background of weather interface 602 and bounces off of bezel 600c of computer system 600. In some embodiments, computer system 600 updates the appearance of the rainfall based on the current rain conditions. For example, if the rainfall is moderate, rainfall 650 is shown with a moderate amount of raindrops as depicted in FIG. 6J. If rainfall is light, rainfall 650 is shown with fewer and/or less density of raindrops, and if rainfall is heavy, rainfall 650 is shown with a greater amount and/or density of raindrops, as shown in FIGS. 6K and 6L.

In some embodiments, computer system 600 updates the current weather conditions for weather interface 602 to include important, time-sensitive weather information such as warnings or other indications of severe weather. For example, in FIG. 6K, computer system 600 displays notification 652 indicating severe weather in New York. In some embodiments, computer system 600 reduces the size of notification 652 after a predetermined amount of time, as shown in FIG. 6L, so that the current weather conditions are visible in weather interface 602. In some embodiments, notification 652 can be selected in FIG. 6L to expand the notification as shown in FIG. 6K.

In some embodiments, computer system 600 can display different portions of weather interface 602 in response to detecting a selection of different weather complications in a user interface of computer system 600. For example, in FIG. 6M, computer system 600 displays watch interface 654, which includes date and time information and various complications such as a fitness complication for launching a fitness application, a mail complication for launching an email application, and a messages complication for launching a messaging application. Watch interface 654 also includes weather complications 656 and 658 corresponding to a weather application for displaying weather interface 602. Weather complication 656 corresponds to current wind information (e.g., wind speed and/or wind direction). In response to detecting input 607-6 selecting weather complication 656, computer system 600 displays weather interface 602 including current wind speed information 662 (e.g., a "now" forecast for the wind speed dataset), as shown in FIG. 6N. Current wind speed information 662 corresponds to the top portion of weather interface 602, as indicated by dot 614-1, with wind speed dataset selected. Weather complication 658 corresponds to hourly wind information. In response to detecting input 607-7 selecting weather complication 658, computer system 600 displays weather interface 602 including hourly wind speed forecast 634, as shown in FIG. 6O. Hourly wind speed forecast 634 corresponds to the middle portion of weather interface 602, as indicated by dot 614-2, with wind speed dataset selected. In some embodiments, the interface depicted in FIG. 6O can be displayed in response to a scroll gesture (e.g., a downward scroll gesture) on crown 600b in FIG. 6N. Similarly, the interface depicted in FIG. 6N can be displayed in response to a scroll gesture (e.g., an upward scroll gesture) on crown 600b in FIG. 6O.

FIG. 7 is a flow diagram illustrating a method for managing weather information using a computer system in accordance with some embodiments. Method 700 is performed at a computer system (e.g., 100, 300, 500, 600) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) a display generation component (e.g., 600a) (e.g., a display controller, a touch-sensitive display system, a display screen, a monitor, a projector, a holographic display, and/or a head-mounted display system) and one or more input devices (e.g., 600a and/or 600b) (e.g., a rotatable input mechanism, a depressible input mechanism, a rotatable and depressible input mechanism, a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 700 are, optionally, combined, the orders of some operations are, optionally, changed, and some operations are, optionally, omitted.

As described below, method 700 provides an intuitive way for managing weather information. The method reduces the cognitive burden on a user for managing weather information, thereby creating a more efficient human-machine interface. For battery-operated computing devices, enabling a user to manage weather information faster and more efficiently conserves power and increases the time between battery charges.

In method 700, while displaying, via the display generation component (e.g., 600a), a weather interface (e.g., 602) that includes a first weather dataset (e.g., 604, 622, 626, 634, 638, 640, 646, 662) (e.g., 630-1, 630-2, 630-3, 630-4, 630-5, 630-6, 630-7, 630-8, 630-9) (e.g., weather conditions, air quality index (AQI), temperature, precipitation, humidity, visibility, ultraviolet index (UVI), wind speed, and/or wind direction for a respective location) for a first time period (e.g., a "current" time period, an hourly forecast, a daily forecast, a weekly forecast, a 10-day forecast, a 2-week forecast), the computer system (e.g., 600) receives (702) an input (e.g., 605-1, 605-2, 605-3, 607-1, 607-2, 607-3, 607-4, 607-5, 607-6, and/or 607-7) via the one or more input devices (e.g., 600a and/or 600b).

In response to receiving the input while displaying the weather interface (e.g., 602) that includes the first weather dataset for the first time period, the computer system (e.g., 600) updates (704) the weather interface, including the following steps. In accordance with a determination that the input is a first type of input (e.g., 605-1, 605-2, or 605-3) (e.g., a rotation input using a rotatable input mechanism (e.g., 600b)), the computer system updates (706) the weather interface to include (e.g., display) the first weather dataset for a second time period that is different from the first time period (e.g., changing from current weather conditions 604 in FIG. 6A to hourly weather conditions forecast 622 in FIG. 6B, changing from hourly weather conditions forecast 622 in FIG. 6B to weekly weather conditions forecast 626 in FIG. 6C, or changing from hourly temperature forecast 638 in FIG. 6G to current temperature forecast 640 in FIG. 6H). In accordance with a determination that the input is a second type of input (e.g., 607-1, 607-2, or 607-3) (e.g., a touch input on the display generation component (e.g., 600a)) different from the first type of input, the computer system updates (708) the weather interface (e.g., 602) to include (e.g., display) a second weather dataset for the first time period, wherein the second weather dataset is different from the first weather dataset (e.g., a different one of weather conditions, air quality index (AQI), temperature, precipitation, humidity, visibility, ultraviolet index (UVI), wind speed, and/or wind direction for the respective location) (e.g., changing from hourly wind forecast 634 in FIG. 6F to hourly temperature forecast 638 in FIG. 6G). Updating the weather interface to include the first weather dataset for a second time period when the input is a first type of input and updating the weather interface to include a second weather dataset for the first time period when the input is a second type of input provides additional control options for changing the time period or weather dataset for the weather interface without cluttering the user interface with additional displayed controls.

In some embodiments, while displaying the weather interface (e.g., 602) including a menu user interface object (e.g., 618) (e.g., a graphical user interface object that is selectable for displaying a listing or menu of datasets that can be selected to display a new weather dataset), the computer system (e.g., 600) receives an input (e.g., 607-1) directed to the menu user interface object. In response to receiving the input directed to the menu user interface object, the computer system displays a menu (e.g., 628) (e.g., a listing) that includes a plurality of items (e.g., 630-1, 630-2, 630-3, 630-4, 630-5, 630-6, 630-7, 630-8, 630-9) corresponding to weather datasets (e.g., for the first time period) (in some embodiments the items in the menu are selectable to display a respective weather dataset for the current time period). Displaying a menu that includes a plurality of items corresponding to weather datasets in response to an input directed to the menu user interface object provides additional control options for changing a weather dataset for the weather interface without cluttering the user interface with additional displayed controls. In some embodiments, in response to detecting a selection (e.g., 607-2) of a respective item (e.g., 630-2) in the menu, the computer system updates the weather interface (e.g., 602) to include a respective weather dataset (e.g., 634) corresponding to the selected item. For example, switching from displaying the current air quality index for the respective location to displaying the current temperature for the respective location. As another example, switching from displaying an hourly visibility forecast for the respective location to displaying an hourly wind speed forecast for the respective location. As another example, switching from displaying a daily weather conditions forecast for the respective location to displaying a daily ultraviolet index forecast for the respective location. As another example, switching from displaying a weekly precipitation forecast for the respective location to displaying a weekly temperature forecast for the respective location.

In some embodiments, while displaying the weather interface (e.g., 602) that includes the first weather dataset (e.g., 646) for the first time period (or a respective weather dataset for a respective time period), the computer system (e.g., 600) receives data corresponding to a respective weather event (e.g., data indicating occurrence of severe weather or other weather conditions that meet relevancy criteria (criteria that is met when the weather event is imminent and, optionally, has a risk of causing harm and/or damage)); and in response to receiving the data corresponding to the respective weather event, the computer system updates the weather interface. In some embodiments, updating the weather interface includes: in accordance with a determination that the first time period (or respective time period) corresponds to current weather conditions (e.g., a "now" forecast and/or a display of current weather conditions), updating the weather interface to include an indication (e.g., 652) of the respective weather event (e.g., updating the first weather dataset (or respective weather dataset) to include the indication of the respective weather event); and in accordance with a determination that the first time period (or respective time period) does not correspond to current weather conditions (e.g., the first time period (or respective time period) is a future forecast such as an hourly forecast, a daily forecast, a weekly forecast, a 10-day forecast, or a 2-week forecast), forgoing updating the weather interface to include the indication of the respective weather event (e.g., the indication of the respective weather event is not displayed in the first weather dataset for the first time period (or respective weather dataset for the respective time period), but can be displayed by accessing the first weather dataset (or respective weather dataset) for a time period that corresponds to current weather conditions). Updating the weather interface to include an indication of a respective weather event when the first time period corresponds to current weather conditions, and forgoing updating the weather interface to include the indication of the respective weather event when the first time period does not correspond to current weather conditions, provides improved feedback by informing the user of a respective weather event when the event is relevant to the content displayed in the weather interface and enhances operability of the computer system by automatically performing an operation (displaying an indication of the respective weather event) when a set of conditions have been met without requiring further user input. In some embodiments, relevant weather events (e.g., severe weather) are added to the "now" forecast when they are detected.

In some embodiments, the second time period is a current time period (e.g., a contemporary and/or immediate time period). In some embodiments, updating the weather interface (e.g., 602) to include the first weather dataset for the second time period that is different from the first time period includes updating the weather interface to include (e.g., display) an indication (e.g., 604, 603, 608, 610, and/or 612) of current conditions (e.g., current readings and/or conditions) corresponding to the first weather dataset for the current time period (e.g., current weather conditions, current air quality index (AQI), current temperature, current precipitation measurements, current humidity measurements, current visibility, current ultraviolet index (UVI), current wind speed, and/or current wind direction). Updating the weather interface to include an indication of current conditions corresponding to the first weather dataset for the current time period provides improved feedback by informing the user of current weather conditions that are relevant to the content displayed in the weather interface. In some embodiments, a "now" forecast includes current weather conditions for the currently selected weather dataset.

In some embodiments, updating the weather interface (e.g., 602) to include the indication of current conditions corresponding to the first weather dataset includes: in accordance with a determination that the current conditions include a first type of current weather event (e.g., moderate rainfall, heavy snowfall, and/or high winds), updating an appearance of a background portion of the weather interface to include a representation (e.g., 647 and/or 650 in FIG. 6J) of the first type of current weather event (e.g., moderate rain falling in the background, heavy snow falling in the background, and/or high wind blowing in the background); and in accordance with a determination that the current conditions include a second type of current weather event (e.g., light rainfall, heavy rainfall, light snowfall, and/or severe storms) different from the first type of current weather event, updating the appearance of the background portion of the weather interface to include a representation of the second type of current weather event (e.g., 615 in FIG. 6A, or 647 and/or 650 in FIGS. 6K and 6L) (e.g., light rain falling in the background, heavy rain falling in the background, light snow falling in the background, and/or dark clouds in the background). Updating an appearance of a background portion of the weather interface to include a representation of the first type of current weather event and updating the appearance of the background portion to include a representation of the second type of current weather event provides improved feedback by informing the user of current weather conditions. In some embodiments, the background of the weather interface changes appearance based on current weather conditions and/or a current weather event.

In some embodiments, the computer system (e.g., 600) includes a bezel (e.g., 600c) (e.g., a frame of the computer system that abuts one or more edges of the display generation component (e.g., 600a)). In some embodiments, the bezel includes a border region at an edge of the display generation component. In some embodiments, updating the weather interface to include the indication of current conditions corresponding to the first weather dataset includes displaying an animated effect that includes a representation of precipitation (e.g., 650) deflecting off (e.g., bouncing off of, hitting, colliding with, and/or stacking up on) the bezel (e.g., as shown in FIGS. 6J-6L). Displaying an animated effect that includes a representation of precipitation deflecting off the bezel provides improved feedback by informing the user that current weather conditions include precipitation. In some embodiments, when the "now" forecast includes precipitation, the computer system displays the "now" forecast including an animation of the precipitation bouncing off the bezel of the computer system (e.g., in the background region of the weather interface).

In some embodiments, the second time period is a short-term time period (e.g., an hourly time period (e.g., two hours, four hours, six hours, eight hours, 12 hours, 18 hours)); and updating the weather interface (e.g., 602) to include the first weather dataset for the second time period that is different from the first time period includes updating the weather interface to include (e.g., display) an indication (e.g., 622, 634, and/or 638) of hourly conditions corresponding to the first weather dataset for the short-term time period (e.g., an hourly forecast for weather conditions, air quality index (AQI), temperature, precipitation measurements, humidity measurements, visibility, ultraviolet index (UVI), wind speed, and/or wind direction). Updating the weather interface to include an indication of hourly conditions corresponding to the first weather dataset for a short-term time period provides improved feedback by informing the user of a short-term forecast for the first weather dataset. In some embodiments, an hourly forecast is a short-term (e.g., hourly) forecast for a currently selected weather dataset.

In some embodiments, the second time period is a long-term time period (e.g., a daily time period (e.g., one day, five days, one week, ten days, two weeks)); and updating the weather interface (e.g., 602) to include the first weather dataset for the second time period that is different from the first time period includes updating the weather interface to include (e.g., display) an indication (e.g., 626) of daily conditions corresponding to the first weather dataset for the long-term time period (e.g., a weekly forecast, a 5-day forecast, a 10-day forecast, and/or a 15-day forecast for weather conditions, air quality index (AQI), temperature, precipitation measurements, humidity measurements, visibility, ultraviolet index (UVI), wind speed, and/or wind direction). Updating the weather interface to include an indication of daily conditions corresponding to the first weather dataset for a long-term time period provides improved feedback by informing the user of a long-term forecast for the first weather dataset. In some embodiments, a 5-day forecast, weekly forecast, 10-day forecast, and/or 15-day forecast is a long-term (e.g., daily) forecast for a currently selected weather dataset.

In some embodiments, the one or more input devices includes a rotatable input mechanism (e.g., 600b) (e.g., a watch crown) and the first type of input includes a rotation input (e.g., 605-1, 605-2, and/or 605-3) using the rotatable input mechanism (e.g., a rotation of the watch crown). In some embodiments, the second type of input includes a touch input (e.g., 607-1, 607-2, 607-3, 607-4, 607-5, 607-6, and/or 607-7) on a touch-sensitive surface (e.g., 600a) (e.g., a touch or tap input on a touch-sensitive display).

In some embodiments, while displaying the weather interface (e.g., 602) including a location user interface object (e.g., 616) (e.g., a graphical user interface object that is selectable for displaying a listing of locations that can be selected to display a new weather dataset), the computer system (e.g., 600) receives an input (e.g., 607-4) directed to the location user interface object. In response to receiving the input directed to the location user interface object, the computer system displays a listing (e.g., 642) that includes a plurality of locations (e.g., 644-1, 644-2, and/or 644-3) corresponding to weather datasets (e.g., for the first time period) (in some embodiments the locations in the listing are selectable to display a respective weather dataset for the selected location). Displaying a listing that includes a plurality of locations corresponding to weather datasets in response to an input directed to the location user interface object provides additional control options for changing a location for the weather dataset for the weather interface without cluttering the user interface with additional displayed controls. In some embodiments, in response to detecting a selection of a location in the listing of locations, the computer system updates the weather interface to include (e.g., display) the currently selected weather dataset (for the currently selected time period) for the location selected from the listing. If the selected location is a first location, the computer system updates the weather interface to display the currently selected weather dataset and time period for the first location, and if the selection location is a second location (different from the first location), the computer system updates the weather interface to display the currently selected weather dataset and time period for the second location. For example, switching from displaying the current weather conditions in Phoenix to displaying the current weather conditions for Oakland. As another example, switching from displaying an hourly visibility forecast for Dallas to displaying an hourly visibility forecast for Chicago. As another example, switching from displaying a daily weather conditions forecast for Denver to displaying a daily weather conditions forecast for New York. As another example, switching from displaying a weekly precipitation forecast for Paris to displaying a weekly precipitation forecast for London.

In some embodiments, while displaying a user interface (e.g., 654) (e.g., a watch face) that includes a set of one or more weather complications (e.g., 656 and/or 658) corresponding to a respective weather dataset (e.g., a currently selected weather dataset), the computer system (e.g., 600) detects an input (e.g., 607-6 or 607-7) that includes a selection of one of the weather complications. In response to detecting the input that includes the selection of one of the weather complications, the computer system displays the weather interface (e.g., 602). In some embodiments, displaying the weather interface includes: in accordance with a determination that the input (e.g., 607-6) includes a selection of a first weather complication (e.g., 656) corresponding to a first subset of the respective weather dataset (e.g., a first forecast complication for the respective weather dataset (e.g., a wind conditions complication)), displaying a first portion (e.g., 662) of the weather interface that includes the first subset of the respective weather dataset (e.g., a first respective forecast for the respective weather dataset (e.g., current wind conditions)); and in accordance with a determination that the input (e.g., 607-7) includes a selection of a second weather complication (e.g., 658) corresponding to a second subset of the respective weather dataset that is different from the first subset of the respective weather dataset (e.g., a second forecast complication for the respective weather dataset (e.g., an hourly wind chart)), displaying a second portion (e.g., 634) of the weather interface (e.g., 602) that is different from the first portion of the weather interface and includes the second subset of the respective weather dataset (e.g., a second respective forecast for the respective weather dataset (e.g., an hourly wind forecast)). Displaying a first portion of the weather interface that includes the first subset of the respective weather dataset when the input includes a selection of a first weather complication corresponding to the first subset of the respective weather dataset, and displaying a second portion of the weather interface that includes the second subset of the respective weather dataset when the input includes a selection of a second weather complication corresponding to the second subset of the respective weather dataset, provides additional control options for accessing different portions of the weather interface without cluttering the user interface with additional displayed controls and reduces inputs at the computer system for accessing relevant portions of the weather interface. In some embodiments, different weather complications for a same weather dataset are selectable to display different sections of the weather application that are directed to the weather dataset.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to display weather information. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted weather content that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of weather services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, weather content can be selected and delivered to users by inferring preferences based on non-personal information data or a bare minimum amount of personal information, such as the content being requested by the device associated with a user, other non-personal information available to the weather services, or publicly available information.

What is claimed is:

1. A computer system configured to communicate with a display generation component and one or more input devices, comprising:

one or more processors; and memory storing one or more programs configured to be executed by the one or more processors, the one or more programs including instructions for:

while displaying, via the display generation component, a weather interface that includes a first weather dataset for a first time period, receiving an input via the one or more input devices; and in response to receiving the input while displaying the weather interface that includes the first weather dataset for the first time period, updating the weather interface, including:

in accordance with a determination that the input is a first type of input, updating the weather interface to include the first weather dataset for a second time period that is different from the first time period; and in accordance with a determination that the input is a second type of input different from the first type of input, updating the weather interface to include a second weather dataset for the first time period, wherein the second weather dataset is different from the first weather dataset.

2. The computer system of claim 1, the one or more programs further including instructions for:

while displaying the weather interface including a menu user interface object, receiving an input directed to the menu user interface object; and in response to receiving the input directed to the menu user interface object, displaying a menu that includes a plurality of items corresponding to weather datasets.

3. The computer system of claim 1, the one or more programs further including instructions for:

while displaying the weather interface that includes the first weather dataset for the first time period:

receiving data corresponding to a respective weather event; and in response to receiving the data corresponding to the respective weather event, updating the weather interface, including:

in accordance with a determination that the first time period corresponds to current weather conditions, updating the weather interface to include an indication of the respective weather event; and in accordance with a determination that the first time period does not correspond to current weather conditions, forgoing updating the weather interface to include the indication of the respective weather event.

4. The computer system of claim 1, wherein:

the second time period is a current time period; and updating the weather interface to include the first weather dataset for the second time period that is different from the first time period includes updating the weather interface to include an indication of current conditions corresponding to the first weather dataset for the current time period.

5. The computer system of claim 4, wherein updating the weather interface to include the indication of current conditions corresponding to the first weather dataset includes:

in accordance with a determination that the current conditions include a first type of current weather event, updating an appearance of a background portion of the weather interface to include a representation of the first type of current weather event; and in accordance with a determination that the current conditions include a second type of current weather event different from the first type of current weather event, updating the appearance of the background portion of the weather interface to include a representation of the second type of current weather event.

6. The computer system of claim 4, wherein:

the computer system includes a bezel; and updating the weather interface to include the indication of current conditions corresponding to the first weather dataset includes displaying an animated effect that includes a representation of precipitation deflecting off the bezel.

7. The computer system of claim 1, wherein:

the second time period is a short-term time period; and updating the weather interface to include the first weather dataset for the second time period that is different from the first time period includes updating the weather interface to include an indication of hourly conditions corresponding to the first weather dataset for the short-term time period.

8. The computer system of claim 1, wherein:

the second time period is a long-term time period; and updating the weather interface to include the first weather dataset for the second time period that is different from the first time period includes updating the weather interface to include an indication of daily conditions corresponding to the first weather dataset for the long-term time period.

9. The computer system of claim 1, wherein the one or more input devices includes a rotatable input mechanism and the first type of input includes a rotation input using the rotatable input mechanism.

10. The computer system of claim 1, wherein the second type of input includes a touch input on a touch-sensitive surface.

11. The computer system of claim 1, the one or more programs further including instructions for:

while displaying the weather interface including a location user interface object, receiving an input directed to the location user interface object; and in response to receiving the input directed to the location user interface object, displaying a listing that includes a plurality of locations corresponding to weather datasets.

12. The computer system of claim 1, the one or more programs further including instructions for:

while displaying a user interface that includes a set of one or more weather complications corresponding to a respective weather dataset, detecting an input that includes a selection of one of the weather complications; and in response to detecting the input that includes the selection of one of the weather complications, displaying the weather interface, including:

in accordance with a determination that the input includes a selection of a first weather complication corresponding to a first subset of the respective weather dataset, displaying a first portion of the weather interface that includes the first subset of the respective weather dataset; and in accordance with a determination that the input includes a selection of a second weather complication corresponding to a second subset of the respective weather dataset that is different from the first subset of the respective weather dataset, displaying a second portion of the weather interface that is different from the first portion of the weather interface and includes the second subset of the respective weather dataset.

13. A non-transitory computer-readable storage medium storing one or more programs configured to be executed by one or more processors of a computer system that is in communication with a display generation component and one or more input devices, the one or more programs including instructions for:

while displaying, via the display generation component, a weather interface that includes a first weather dataset for a first time period, receiving an input via the one or more input devices; and in response to receiving the input while displaying the weather interface that includes the first weather dataset for the first time period, updating the weather interface, including:

in accordance with a determination that the input is a first type of input, updating the weather interface to include the first weather dataset for a second time period that is different from the first time period; and in accordance with a determination that the input is a second type of input different from the first type of input, updating the weather interface to include a second weather dataset for the first time period, wherein the second weather dataset is different from the first weather dataset.

14. The non-transitory computer-readable storage medium of claim 13, the one or more programs further including instructions for:

while displaying the weather interface including a menu user interface object, receiving an input directed to the menu user interface object; and in response to receiving the input directed to the menu user interface object, displaying a menu that includes a plurality of items corresponding to weather datasets.

15. The non-transitory computer-readable storage medium of claim 13, the one or more programs further including instructions for:

while displaying the weather interface that includes the first weather dataset for the first time period:

receiving data corresponding to a respective weather event; and in response to receiving the data corresponding to the respective weather event, updating the weather interface, including:

in accordance with a determination that the first time period corresponds to current weather conditions, updating the weather interface to include an indication of the respective weather event; and in accordance with a determination that the first time period does not correspond to current weather conditions, forgoing updating the weather interface to include the indication of the respective weather event.

16. The non-transitory computer-readable storage medium of claim 13, wherein:

the second time period is a current time period; and updating the weather interface to include the first weather dataset for the second time period that is different from the first time period includes updating the weather interface to include an indication of current conditions corresponding to the first weather dataset for the current time period.

17. The non-transitory computer-readable storage medium of claim 16, wherein updating the weather interface to include the indication of current conditions corresponding to the first weather dataset includes:

in accordance with a determination that the current conditions include a first type of current weather event, updating an appearance of a background portion of the weather interface to include a representation of the first type of current weather event; and in accordance with a determination that the current conditions include a second type of current weather event different from the first type of current weather event, updating the appearance of the background portion of the weather interface to include a representation of the second type of current weather event.

18. The non-transitory computer-readable storage medium of claim 16, wherein:

the computer system includes a bezel; and updating the weather interface to include the indication of current conditions corresponding to the first weather dataset includes displaying an animated effect that includes a representation of precipitation deflecting off the bezel.

19. The non-transitory computer-readable storage medium of claim 13, wherein:

the second time period is a short-term time period; and updating the weather interface to include the first weather dataset for the second time period that is different from the first time period includes updating the weather interface to include an indication of hourly conditions corresponding to the first weather dataset for the short-term time period.

20. The non-transitory computer-readable storage medium of claim 13, wherein:

the second time period is a long-term time period; and updating the weather interface to include the first weather dataset for the second time period that is different from the first time period includes updating the weather interface to include an indication of daily conditions corresponding to the first weather dataset for the long-term time period.

21. The non-transitory computer-readable storage medium of claim 13, wherein the one or more input devices includes a rotatable input mechanism and the first type of input includes a rotation input using the rotatable input mechanism.

22. The non-transitory computer-readable storage medium of claim 13, wherein the second type of input includes a touch input on a touch-sensitive surface.

23. The non-transitory computer-readable storage medium of claim 13, the one or more programs further including instructions for:

while displaying the weather interface including a location user interface object, receiving an input directed to the location user interface object; and in response to receiving the input directed to the location user interface object, displaying a listing that includes a plurality of locations corresponding to weather datasets.

24. The non-transitory computer-readable storage medium of claim 13, the one or more programs further including instructions for:

while displaying a user interface that includes a set of one or more weather complications corresponding to a respective weather dataset, detecting an input that includes a selection of one of the weather complications; and in response to detecting the input that includes the selection of one of the weather complications, displaying the weather interface, including:

in accordance with a determination that the input includes a selection of a first weather complication corresponding to a first subset of the respective weather dataset, displaying a first portion of the weather interface that includes the first subset of the respective weather dataset; and in accordance with a determination that the input includes a selection of a second weather complication corresponding to a second subset of the respective weather dataset that is different from the first subset of the respective weather dataset, displaying a second portion of the weather interface that is different from the first portion of the weather interface and includes the second subset of the respective weather dataset.

25. A method, comprising:

at a computer system that is in communication with a display generation component and one or more input devices:

while displaying, via the display generation component, a weather interface that includes a first weather dataset for a first time period, receiving an input via the one or more input devices; and in response to receiving the input while displaying the weather interface that includes the first weather dataset for the first time period, updating the weather interface, including:

in accordance with a determination that the input is a first type of input, updating the weather interface to include the first weather dataset for a second time period that is different from the first time period; and in accordance with a determination that the input is a second type of input different from the first type of input, updating the weather interface to include a second weather dataset for the first time period, wherein the second weather dataset is different from the first weather dataset.

26. The method of claim 25, further comprising:

while displaying the weather interface including a menu user interface object, receiving an input directed to the menu user interface object; and in response to receiving the input directed to the menu user interface object, displaying a menu that includes a plurality of items corresponding to weather datasets.

27. The method of claim 25, further comprising:

while displaying the weather interface that includes the first weather dataset for the first time period:

receiving data corresponding to a respective weather event; and in response to receiving the data corresponding to the respective weather event, updating the weather interface, including:

in accordance with a determination that the first time period corresponds to current weather conditions, updating the weather interface to include an indication of the respective weather event; and in accordance with a determination that the first time period does not correspond to current weather conditions, forgoing updating the weather interface to include the indication of the respective weather event.

28. The method of claim 25, wherein:

the second time period is a current time period; and updating the weather interface to include the first weather dataset for the second time period that is different from the first time period includes updating the weather interface to include an indication of current conditions corresponding to the first weather dataset for the current time period.

29. The method of claim 28, wherein updating the weather interface to include the indication of current conditions corresponding to the first weather dataset includes:

in accordance with a determination that the current conditions include a first type of current weather event, updating an appearance of a background portion of the weather interface to include a representation of the first type of current weather event; and in accordance with a determination that the current conditions include a second type of current weather event different from the first type of current weather event, updating the appearance of the background portion of the weather interface to include a representation of the second type of current weather event.

30. The method of claim 28, wherein:

the computer system includes a bezel; and updating the weather interface to include the indication of current conditions corresponding to the first weather dataset includes displaying an animated effect that includes a representation of precipitation deflecting off the bezel.

31. The method of claim 25, wherein:

the second time period is a short-term time period; and updating the weather interface to include the first weather dataset for the second time period that is different from the first time period includes updating the weather interface to include an indication of hourly conditions corresponding to the first weather dataset for the short-term time period.

32. The method of claim 25, wherein:

the second time period is a long-term time period; and updating the weather interface to include the first weather dataset for the second time period that is different from the first time period includes updating the weather interface to include an indication of daily conditions corresponding to the first weather dataset for the long-term time period.

33. The method of claim 25, wherein the one or more input devices includes a rotatable input mechanism and the first type of input includes a rotation input using the rotatable input mechanism.

34. The method of claim 25, wherein the second type of input includes a touch input on a touch-sensitive surface.

35. The method of claim 25, further comprising:

while displaying the weather interface including a location user interface object, receiving an input directed to the location user interface object; and in response to receiving the input directed to the location user interface object, displaying a listing that includes a plurality of locations corresponding to weather datasets.

36. The method of claim 25, further comprising:

while displaying a user interface that includes a set of one or more weather complications corresponding to a respective weather dataset, detecting an input that includes a selection of one of the weather complications; and in response to detecting the input that includes the selection of one of the weather complications, displaying the weather interface, including:

in accordance with a determination that the input includes a selection of a first weather complication corresponding to a first subset of the respective weather dataset, displaying a first portion of the weather interface that includes the first subset of the respective weather dataset; and in accordance with a determination that the input includes a selection of a second weather complication corresponding to a second subset of the respective weather dataset that is different from the first subset of the respective weather dataset, displaying a second portion of the weather interface that is different from the first portion of the weather interface and includes the second subset of the respective weather dataset.

* * * * *